US009036957B2

(12) United States Patent
Nagarajan et al.

(10) Patent No.: US 9,036,957 B2
(45) Date of Patent: May 19, 2015

(54) SHARED PROPAGATION REGION FOR AN OPTICAL MULTIPLEXER OR AN OPTICAL DEMULTIPLEXER

(75) Inventors: Radhakrishnan L. Nagarajan, Cupertino, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 84 days.

(21) Appl. No.: 13/537,771

(22) Filed: Jun. 29, 2012

(65) Prior Publication Data

US 2014/0003759 A1 Jan. 2, 2014

(51) Int. Cl.
G02B 6/12 (2006.01)
G02F 1/01 (2006.01)

(52) U.S. Cl.
CPC ............ *G02F 1/011* (2013.01); *G02B 6/12014* (2013.01); *G02B 6/12019* (2013.01); *G02B 2006/12116* (2013.01); *G02B 2006/12123* (2013.01)

(58) Field of Classification Search
None
See application file for complete search history.

(56) References Cited

U.S. PATENT DOCUMENTS

| 5,414,548 | A * | 5/1995 | Tachikawa et al. | 398/87 |
| 5,684,899 | A * | 11/1997 | Ota | 385/24 |
| 5,809,184 | A * | 9/1998 | Doerr et al. | 385/11 |
| 6,282,344 | B1 * | 8/2001 | Bergmann et al. | 385/46 |
| 6,434,292 | B1 * | 8/2002 | Kim et al. | 385/24 |
| 6,477,294 | B1 * | 11/2002 | Jansen Van Doorn et al. | 385/24 |
| 6,684,009 | B2 * | 1/2004 | Ueda | 385/37 |
| 6,904,204 | B2 * | 6/2005 | Hida et al. | 385/37 |
| 7,187,817 | B2 * | 3/2007 | Anton et al. | 385/14 |
| 7,295,783 | B2 * | 11/2007 | Singh et al. | 398/175 |
| 7,382,953 | B1 * | 6/2008 | Bulthuis et al. | 385/37 |
| 7,440,655 | B2 * | 10/2008 | Grek et al. | 385/37 |
| 7,542,640 | B2 * | 6/2009 | Nara | 385/37 |
| 7,974,504 | B2 * | 7/2011 | Nagarajan et al. | 385/14 |
| 2004/0213582 | A1 * | 10/2004 | Joyner | 398/183 |
| 2008/0031566 | A1 * | 2/2008 | Matsubara et al. | 385/14 |
| 2009/0123113 | A1 * | 5/2009 | Lin et al. | 385/14 |

FOREIGN PATENT DOCUMENTS

| EP | 0936483 A2 * | 8/1999 |
| JP | 2000-241638 A * | 9/2000 |
| JP | 2003-66391 A * | 3/2003 |
| WO | WO 02/086575 A1 * | 10/2002 |

* cited by examiner

Primary Examiner — Mike Stahl
(74) Attorney, Agent, or Firm — Harrity & Harrity LLP; David L. Soltz

(57) ABSTRACT

An optical system may include an optical multiplexer or demultiplexer circuit having a slab with a propagation region. The propagation region may have a first propagation section and a second propagation section, such that a portion of the first propagation section and a portion of the second propagation section overlap each other to form a shared propagation section. The shared propagation section may include both the portion of the first propagation section and the portion of the second propagation section. The first propagation section and the second propagation section may each have a first end and a second end. The optical system may further include multiple waveguides directly connected to the second end of the first propagation section and directly connected to the second end of the second propagation section.

20 Claims, 19 Drawing Sheets

SHARED PROPAGATION REGION FOR AN OPTICAL MULTIPLEXER OR AN OPTICAL DEMULTIPLEXER

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component to provide a laser associated with each wavelength, a modulator configured to modulate the output of the laser, and a multiplexer to combine each of the modulated outputs (e.g., to form a combined output or WDM signal).

The multiplexer may include a first slab, a second slab, and/or one or more waveguides connected to the first slab and the second lab. The first slab may receive multiple inputs (e.g., the modulated outputs from the transmitter component), each having a different wavelength. The first slab may include a propagation region (e.g., a free space) to allow the received inputs to propagate into respective first ends of the waveguides connected to the first slab. Additionally, the waveguides may each have different lengths, such that each waveguide applies a different phase shift to the received inputs. Further, the waveguides may supply the received inputs (e.g., through respective second ends of the waveguides) to the second slab. The received inputs may propagate in the free space, associated with the second slab, in such a way that the second slab supplies a single combined output (e.g., a WDM signal) associated with the received inputs.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, and various polymers and semiconductor materials which are used to make semiconductor lasers, such as GaAs, InP and their alloys.

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

The demultiplexer may include a first slab, a second slab, and one or more waveguides connected to the first slab and the second lab. The first slab may receive an input (e.g., a WDM signal outputted by a multiplexer). The received input may include optical signals, each having a different wavelength. The first slab may include a propagation region (e.g., a free space) to allow multiple optical signals, associated with the received input, to propagate into respective first ends of the waveguides connected to the first slab. Additionally, the waveguides may each have different lengths, such that each waveguide is configured to apply a different phase shift to the multiple optical signals associated with the received input. Further, the waveguides may supply the multiple optical signals (e.g., through respective second ends of the waveguides) to the second slab. The multiple optical signals may propagate through the free space, associated with the second slab, in such a way that the second slab supplies the multiple optical signals associated with the received input.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

SUMMARY

According to one example implementation, an optical system may include an optical multiplexer or demultiplexer circuit having a slab with a propagation region. The propagation region may have a first propagation section and a second propagation section, such that a portion of the first propagation section and a portion of the second propagation section overlap each other to form a shared propagation section. The shared propagation section may include both the portion of the first propagation section and the portion of the second propagation section. The first propagation section may have a first end and a second end, and the second propagation section may have a first end and a second end.

The optical system may further include multiple waveguides. Each of the multiple waveguides may have a respective first end and a respective second end. The first ends of the multiple waveguides may be directly connected to the second end of the first propagation section, and the second ends of the multiple waveguides may be directly connected to the second end of the second propagation section.

According to another example implementation, an optical system may include an optical demultiplexer circuit having a slab with a propagation region. The propagation region may have a first propagation section and a second propagation section, such that a portion of the first propagation section and a portion of the second propagation section overlap each other to form a shared propagation section. The shared propagation section may include both the portion of the first propagation section and the portion of the second propagation section. The first propagation section may have a first end and a second end, and the second propagation section may have a first end and a second end.

The optical demultiplexer circuit may also have multiple waveguides. Each of the multiple waveguides may have a respective first end and a respective second end. The first ends of the multiple waveguides may be directly connected to the second end of the first propagation section. The second ends of the multiple waveguides may be directly connected to the second end of the second propagation section.

The optical demultiplexer circuit may also have multiple first photodiodes optically coupled to the first end of the first propagation section, and multiple second photodiodes optically coupled to the first end to the second propagation section.

According to another example implementation, an optical system may include an optical multiplexer circuit having a slab with a propagation region. The propagation region may include a first propagation section and a second propagation section, such that a portion of the first propagation section and a portion of the second propagation section overlap each other to form a shared propagation section. The shared propagation section may include both the portion of the first propagation section and the portion of the second propagation section. The first propagation section may have a first end and a second end, and the second propagation section may have a first end and a second end.

The optical multiplexer circuit may also have multiple waveguides. Each of the multiple waveguides may have a respective first end and a respective second end. The first ends of the multiple waveguides may be directly connected to the second end of the first propagation section, and the second ends of the multiple waveguides may be directly connected to the second end of the second propagation section.

The optical multiplexer circuit may also have multiple first lasers optically coupled to the first end of the first propagation section, and a multiple second lasers optically coupled to the first end of the second propagation section.

According to another example implementation, an optical system may include a substrate, a slab provided on the substrate, and a first waveguide provided on the substrate and extending from a first portion of the slab. The first waveguide may supply a multiple first optical signals to the first portion of the slab.

The optical system may also include multiple second waveguides, each having a first end and a second end. The first ends of multiple second waveguides may be optically coupled to a second portion of the slab, and the second ends of the multiple second waveguides may be optically coupled to a third portion of the slab.

The optical system may also include a multiple third waveguides provided on the substrate and extending from a fourth portion of the slab. Each of the multiple third waveguides may direct a corresponding one of the multiple first optical signals away from the slab.

The optical system may further include a fourth waveguide extending from the fourth portion of the slab. The fourth waveguide may supply multiple second optical signals to the fourth portion of the slab.

The optical system may also include multiple fifth waveguides extending from the first portion of the slab. Each of the multiple fifth waveguides may direct a corresponding one of the multiple second optical signals away from the slab.

According to another example implementation, an optical system may include a substrate, a slab provided on the substrate, and multiple first waveguides provided on the substrate and extending from a first portion of the slab. Each of the multiple first waveguides may supply a corresponding one of multiple first optical signals to the slab.

The optical system may also include multiple second waveguides. Each of the multiple second waveguides may have a first end and a second end. The first ends of the multiple second waveguides may be optically coupled to a second portion of the slab, and the second ends of the multiple second waveguides may be optically coupled to a third portion of the slab.

The optical system may further include a third waveguide provided on the substrate and extending from a fourth portion of the slab. The third waveguide may direct the multiple first optical signals away from the fourth portion of the slab.

The optical system may also include multiple fourth waveguides extending from the fourth portion of the slab. Each of the multiple fourth waveguides may supply a corresponding one of multiple second optical signals to the fourth portion of the slab.

The optical system may further include a fifth waveguide extending from the first portion of the slab. The fifth waveguide may direct the multiple second optical signals away from the first portion of the slab.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
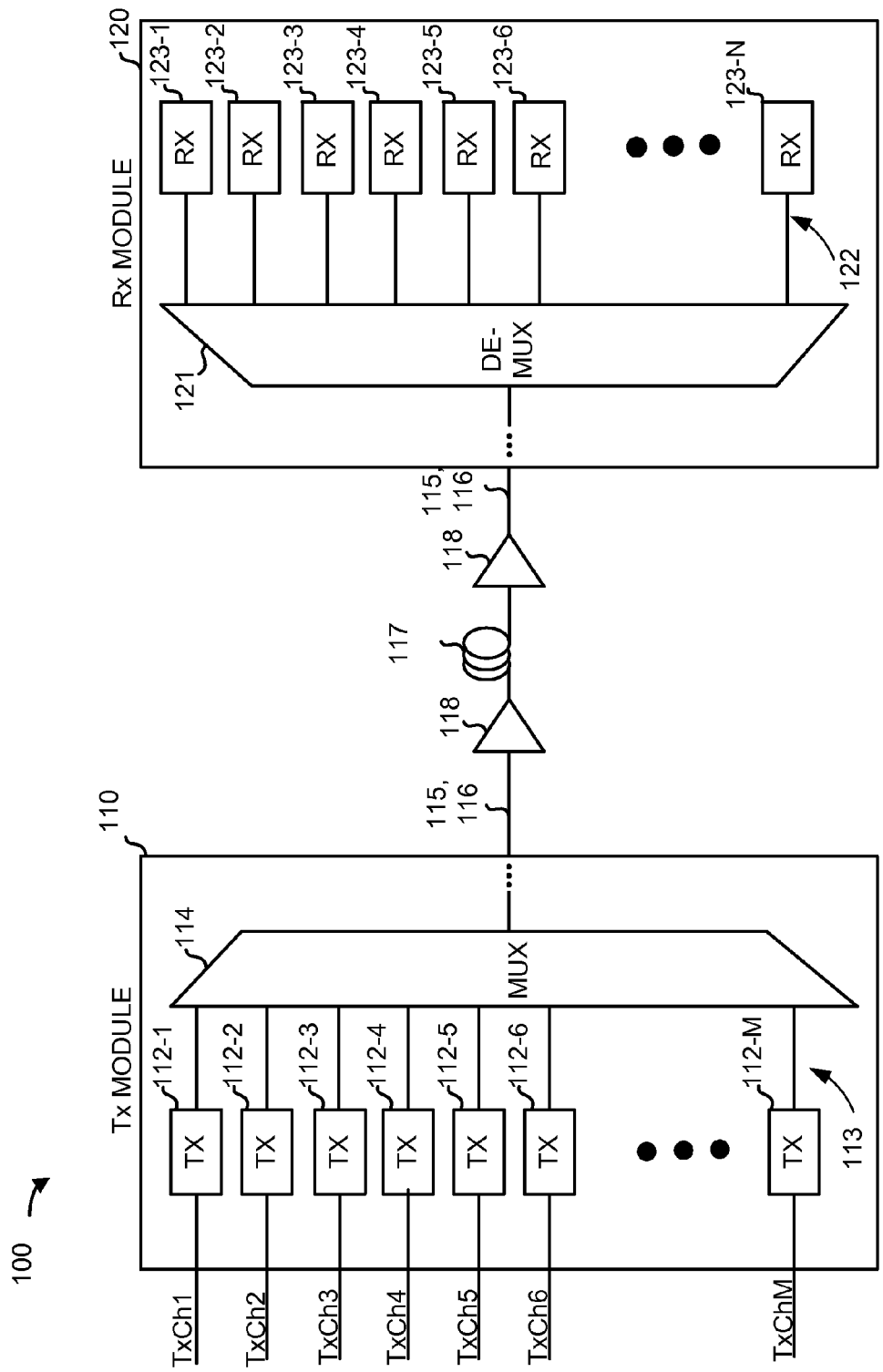
FIG. 1 is a diagram of an example network in which systems and/or methods may be implemented.

The following detailed description refers to the accompanying drawings. The same reference numbers in different drawings may identify the same or similar elements. Also, the following detailed description does not limit the disclosure.

Some implementations described herein may provide a WDM system with a polarizer (e.g., a Transverse Electric (TE) polarizer) and/or a Transverse Magnetic (TM) polarizer) provided on one or more slabs, associated with an optical multiplexer or an optical demultiplexer of the WDM system. In some implementations, the polarizer may include a material to absorb components of an optical signal having a particular polarization (e.g., a TE or TM polarization) when the slab receives and/or supplies the optical signal. Providing the polarizer on the slab of the multiplexer or demultiplexer may allow the multiplexer or demultiplexer to process optical signals with components having one polarization type. In some implementations, the construction of the optical multiplexer or optical demultiplexer may be simplified when the optical multiplexer or optical demultiplexer receives components having the same polarization type. Additionally, the optical demultiplexer may output signals with components having one polarization type based on receiving components with one polarization type. In some implementations, it may be desirable to output signals having the same polarization type in order to match the polarization type of a local oscillator, associated with the WDM system, thereby improving the performance of the local oscillator.

Further, providing the polarizer on the slab of the multiplexer or demultiplexer may reduce the size of the respective PIC, associated with the multiplexer or demultiplexer, in relation to an implementation in which a polarizer is provided as separate element from the multiplexer or demultiplexer. Additionally, providing the polarizer on the slab of the multiplexer or demultiplexer may provide a polarizer with relatively large dimensions, thereby simplifying the process of aligning an input optical signal with the polarizer in relation to aligning the input optical signal with a polarizer in the form of a separate module.

Some implementations described herein may provide a WDM system with a multiplexer or demultiplexer having a single slab functioning as two slabs with one or more waveguides connected to the slab. The slab may include a single propagation region (e.g., a free-space region) having a first propagation section and a second propagation section, such that a portion of the first propagation section and a portion of the second propagation section overlap each other to form a shared propagation section. The first propagation section and the second propagation section may each have a first end and a second end. The multiplexer or demultiplexer may also include one or more waveguides each having a first end and a second end. Respective first ends of the waveguides may connect to the second end of the first propagation section and respective second ends of the waveguides may connect to the second end of the second propagation section.

In some implementations, the slab having the shared propagation region may be associated with an optical multiplexer. For example, the first propagation section may receive multiple inputs having different wavelengths, (e.g., modulated outputs from transmitter components of a transmitter module), and the second propagation section may supply a combined output, associated with the received inputs.

In some implementations, the first propagation section may include a free space to allow the received inputs to propagate into respective first ends of the waveguides connected to the second end of the first propagation section. The waveguides may each have different lengths, such that each waveguide applies a different phase shift to the received inputs. The waveguides may supply the received inputs (e.g., through respective second ends of the waveguides) to the second propagation section having a free space. The received inputs may propagate in the free space, associated with the second propagation section, in such a way that the second propagation section supplies a single combined output (e.g., a WDM signal) associated with the received inputs. The second propagation section may also receive multiple inputs such that the first propagation section outputs a single combined input associated with the inputs received by the second propagation section.

Additionally, or alternatively, the slab having the shared propagation region may be associated with an optical demultiplexer. For example, the first propagation section may receive an input (e.g., a WDM signal outputted by an optical multiplexer, a signal supplied by a polarization beam splitter, a signal supplied by a rotator, and/or some other signal), and the second propagation section may supply multiple outputs (e.g., multiple modulated outputs and/or some other optical signals), associated with the received input.

In some implementations, the received input may include optical signals, each having a different wavelength. The first propagation section may include a free space to allow multiple optical signals, associated with the received input, to propagate into respective first ends of the waveguides connected to the first propagation section. The waveguides may each have different lengths, such that each waveguide applies a different phase shift to the multiple optical signals associated with the received input. Further, the waveguides may supply the multiple optical signals (e.g., through respective second ends of the waveguides) to the second propagation section having a free space. The multiple optical signals may propagate through the free space, associated with the second propagation section, in such a way that the second propagation section supplies the multiple optical signals associated with the received input. The second propagation section may also receive a combined input such that the first propagation section outputs multiple optical signals associated with the combined input received by the second propagation section.

In some implementations, the slab having the shared propagation region may include a material formed on the slab to function as a TE polarizer and/or a TM polarizer in a manner similar to that described above. For example, the first propagation section may include a material to absorb components of an optical signal having a particular polarization. Additionally, or alternatively, the second propagation section may include a material to absorb components of an optical signal having a particular polarization.

In some implementations, providing a multiplexer or demultiplexer with slab having a shared propagation region may reduce the size of the multiplexer or demultiplexer. As a result, additional multiplexers or demultiplexers may be provided in a WDM system to increase data rates and/or processing capacity, associated with the WDM system.

FIG. 1 is a diagram of an example network 100 in which systems and/or methods described herein may be implemented. In practice, network 100 may include additional, fewer, or differently arranged components than are shown in FIG. 1.

As illustrated in FIG. 1, network 100 may include transmitter (Tx) module 110 (e.g., a Tx PIC), and/or receiver (Rx) module 120 (e.g., an Rx PIC). In some implementations, transmitter module 110 may be optically connected to receiver module 120 via link 117. Additionally, link 117 may include one or more optical amplifiers 118 that amplify an optical signal as the optical signal is transmitted over link 117.

Transmitter module 110 may include a number of optical transmitters 112-1 through 112-N (where N≥1), waveguides 113, and/or optical multiplexer 114. Each optical transmitter 112 may receive a data channel (TxCh1 through TxChM), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), and/or some other components. The laser, modulator, and SOA may be coupled with a tuning element that can be used to tune the wavelength of the optical signal channel by the laser, modulator, and/or SOA.

Waveguides 113 may include an optical link or some other link to transmit modulated outputs (referred to as "signal channels") of optical transmitters 112. In some implementations each optical transmitter 112 may include one waveguide 113 or multiple waveguides 113 to transmit signal channels of optical transmitters 112 to optical multiplexer 114.

Optical multiplexer 114 may include an AWG or some other multiplexer device. In some implementations, optical multiplexer 114 may combine multiple signal channels, associated with optical transmitters 112 into a single optical signal 115 (e.g., a WDM signal). In some implementations, a corresponding waveguide may transmit optical signal 115 (e.g., via link 117). For example, optical multiplexer 114 may include an input, (e.g., a first slab to receive input signal channels supplied by optical transmitters 112) and an output (e.g., a second slab to supply a single WDM signal, such as optical signal 115, associated with the input signal channels). Optical multiplexer 114 may also include waveguides connected to the input and the output. In some implementations, the first slab and the second slab may each act as an input and an output. For example, the first slab and the second slab may each receive multiple signal channels (e.g., signal channels supplied by optical transmitters 112). Additionally, the first slab may supply a single WDM signal (e.g., optical signal 115) corresponding to the signal channels received by the second slab. Further, the second slab may supply a single WDM signal (e.g., optical signal 116) corresponding to the signal channels received by the first slab. In some implementations, a corresponding waveguide may transmit optical signal 116 (e.g., via link 117).

As shown in FIG. 1, optical multiplexer 114 may receive signal channels outputted by transmit modules 112, and output optical signal 115 and/or optical signal 116. Additionally, optical signal 115 and/or optical signal 116 may include one or more optical signals, such that each optical signal includes one or more wavelengths. In some implementations, optical signal 115 may include a first polarization (e.g., a TM polarization), and optical signal 116 may include a second polarization (e.g., a TE polarization). Alternatively, optical signal 115 and optical signal 116 may include the same polarization.

While implementations may be described in terms of the TM polarization as the first polarization and the TE polarization as the second polarization, it will be apparent that the first polarization may be the TE polarization and the second polarization may be the TM polarization.

As further shown in FIG. 1, receiver module 120 may include optical demultiplexer 121, waveguides 122, and/or optical receivers 123-1 through 123-N (where N>1). In some implementations, optical demultiplexer 121 may include an AWG or some other demultiplexer device. Additionally, optical demultiplexer 121 may supply multiple signal channels based on receiving one or more optical signals, such as WDM signals (e.g., optical signal 115 and/or optical 116), or components associated with the one or more optical signals. For example, optical demultiplexer 121 may include an input (e.g., a first slab to receive optical signal 115 and/or some other input signal), and an output (e.g., a second slab region to supply multiple signal channels associated with optical signal 115). Additionally, optical demultiplexer 121 may include waveguides connected to the first slab and the second slab. In some implementations, the first slab and the second slab may each act as an input and an output. For example, the first slab and the second slab may each receive an optical signal (e.g., a WDM signal supplied by optical multiplexer 114, an optical signal provided by a rotator, and/or some other optical signal). Additionally, the first slab may supply signal channels corresponding to the optical signal received by the second slab. Further, the second slab may supply signal channels corresponding to the optical signal received by the first slab. As shown in FIG. 1, optical demultiplexer 121 may supply signal channels to optical receivers 123 via waveguides 122.

Waveguides 122 may include an optical link or some other link to transmit outputs of optical demultiplexer 121 to optical receivers 123. In some implementations, each optical receiver 123 may receive outputs via a single waveguide 122 or via multiple waveguides 122.

Optical receivers 123 may each include one or more photodetectors and related devices to receive respective input optical signals outputted by optical demultiplexer 121 and a local oscillator, convert the input optical signals to a photocurrent, and provide voltage outputs corresponding to electrical signals of the input optical signals. Optical receivers 123 may each operate to convert the input optical signal to an electrical signal that represents the transmitted data.

Figure 2A:
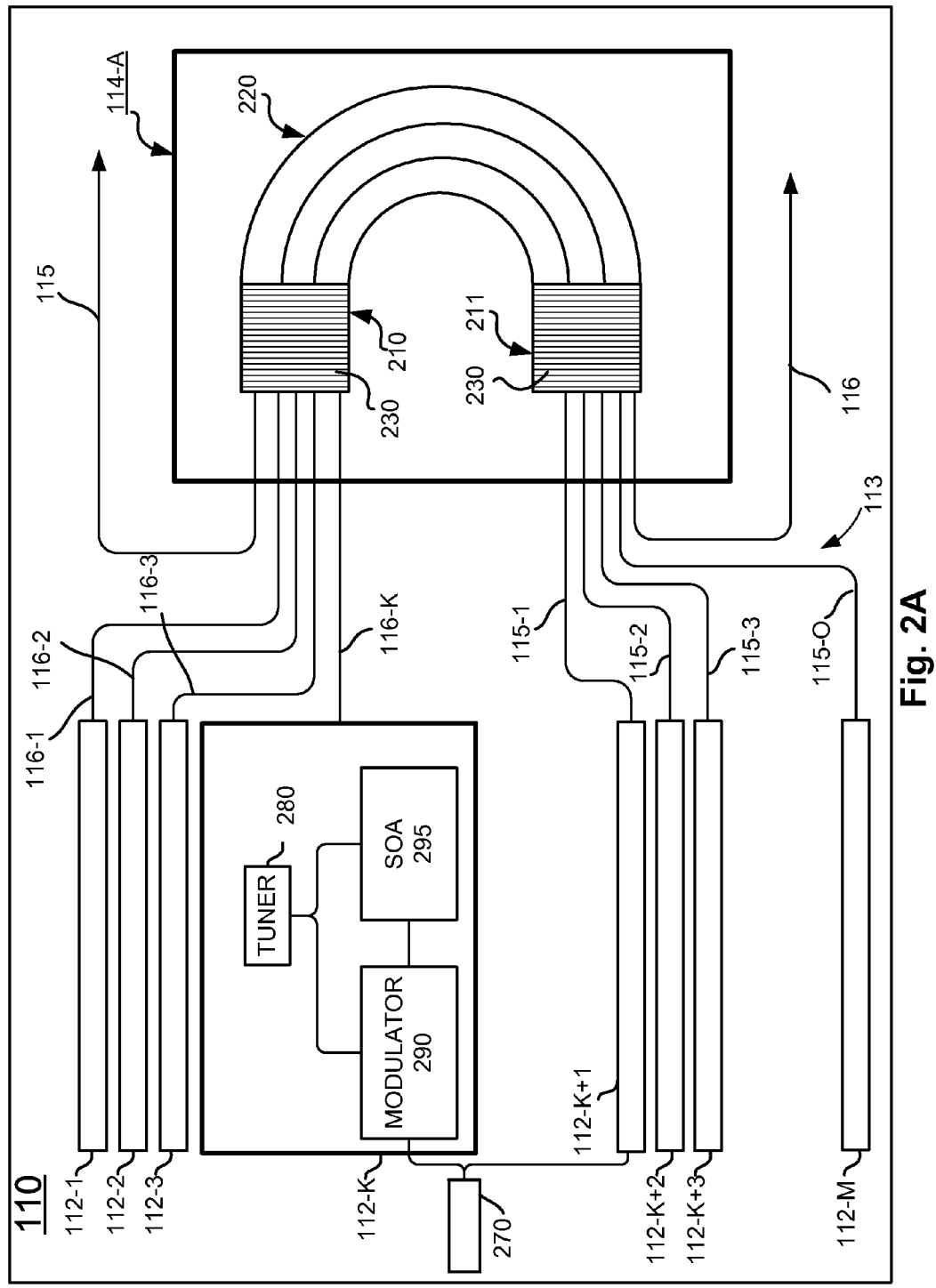
FIG. 2A is a diagram illustrating example components of a transmitter module as shown in FIG. 1.

FIG. 2A is a diagram illustrating example components of transmitter module 110 as shown in FIG. 1. In practice, transmitter module 110 may include additional, fewer, or differently arranged elements than are shown in FIG. 2A.

As shown in FIG. 2A, transmitter module 110 may include optical transmitters 112, waveguides 113, and optical multiplexer 114-A. As described above, optical transmitters 112 may include laser 270, tuner 280, modulator 290, and/or SOA 295.

Laser 270 may include a semiconductor laser, such as a distributed feedback (DFB) laser, or some other type of laser. Laser 270 may provide an output optical light beam to modulator 290. Laser 270 may be an optical source for a corresponding optical transmitter 112.

Tuner 280 may include a tuning device, or a collection of tuning devices. In some implementations, laser 270, modulator 290, and/or SOA 295 may be coupled with tuner 280 such that tuner 280 may tune a wavelength of an optical signal channel associated with laser 270, modulator 290, or SOA 295.

Modulator 290 may include an optical modulator such as an electro-absorption modulator (EAM), or some other type of modulator. Modulator 290 may control (modulate) the intensity of an input optical light beam (e.g., supplied by laser 270), based on an input voltage signal (e.g., signals provided over TxCh1 through TxChM). Modulator 290 may be formed as a waveguide with electrodes for applying an electric field, based on the input voltage signal, in a direction perpendicular to the light beam. Alternatively, modulator 290 may be implemented based on other modulation technologies, such as electro-optic modulation.

SOA 295 may include an amplifying device, or a collection of amplifying devices. In some implementations, SOA 295 may include an amplifier that may directly amplify an input optical signal (e.g., a signal supplied by laser 270). In some implementations, SOA 295 may be replaced by a variable optical attenuator (VOA), or by an element that combines both an SOA and a VOA. Additionally, or alternatively, SOA 295 may function as an SOA and as a VOA.

Waveguides 113 may include individual waveguides associated with individual signal channels outputted by optical transmitters 112. For example, waveguides 113 may include corresponding waveguides to transmit signal channels 116-1, 116-2, 116-3 ... 116-K (where K≥1) supplied by optical transmitters 112-1, 112-2, 112-3 ... 112-K, respectively. Further, waveguides 113 may include corresponding waveguides to transmit signal channels 115-1, 115-2, 115-3 ... 115-O (where O≥1) supplied by optical transmitters 112-K+1, 112-K+2, 112-K+3 ... 112-M).

Optical multiplexer 114-A may include slab 210, slab 211, and/or waveguides 220 connected to slabs 210 and 211. In some implementations, slabs 210 and 211 may each include an input and an output. For example, slab 210 may receive one or more inputs (e.g., signal channels 116-1 through 116-K), and slab 211 may receive one or more inputs (e.g., signal channels 115-1 through 115-O. Waveguides 220 may supply slab 210 with a combined WDM signal (e.g., optical signal 115) associated with the inputs of slab 211. Further, waveguides 220 may supply slab 211 with a combined WDM signal (e.g., optical signal 116) associated with the inputs of slab 210.

For example, slabs 210 and 211 may each include a free-space region (e.g., a propagation region). The free-space regions of slabs 210 and 211 may allow the wavelengths, associated with input signals, to propagate freely. Slab 210 may receive signal channels 116-1 through 116-K, thereby allowing the signal channels to propagate in the free-space region of slab 210. Waveguides 220 may guide individual signal channels associated with the signal channels and supply a combined WDM signal (e.g., optical signal 116) to slab 211. Slab 211 may receive signal channels from optical transmitters 115-1 through 115-O, thereby allowing the received signal channels to propagate in the free-space region of slab 211. Waveguides 220 may guide individual signal channels associated with the received signal channels and supply a combined WDM signal (e.g., optical signal 115) to slab 210. In some implementations, optical multiplexer 114-A may supply optical signals 115 and 116 to optical demultiplexer 121-A (e.g., via link 117).

In some other implementation, slab 210 and/or slab 211 may include an input, but may not include an output. Alternatively, slab 210 and/or 211 may include an output, but may not include an input. For example, slab 210 may include an input to receive signal channels 116-1 through 116-K. Slab 211 may include an output to supply a combined WDM signal (e.g., optical signal 116) associated with the inputs of slab 210. Alternatively, slab 211 may include an input to receive signal channels 115-1 through 115-O. Slab 210 may include an output to supply a combined WDM signal (e.g., optical signal 115) associated with the inputs of slab 211.

In some implementations, slab 210 and/or slab 211 may include material 230 (e.g., to form a polarizer on the respective slab). Material 230 may include a metal, or a metal composite, such gold, titanium, and/or some other material. Material 230 may absorb components of a signal channel, WDM signal, and/or some other optical signal having a particular polarization (e.g., a TE or TM polarization) when the signal channel passes through the respective slab having material 230. For example, as described above, slabs 210 and 211 may receive signal channels from optical transmitters 112, and may supply combined optical signals 115 and 116 (e.g., WDM signals). Material 230 may absorb components of the received signal channels having a particular polarization (e.g., a TE or TM polarization). Further, material 230 may absorb components of optical signal 115 and/or optical signal 116 having a particular polarization.

Figure 2B:
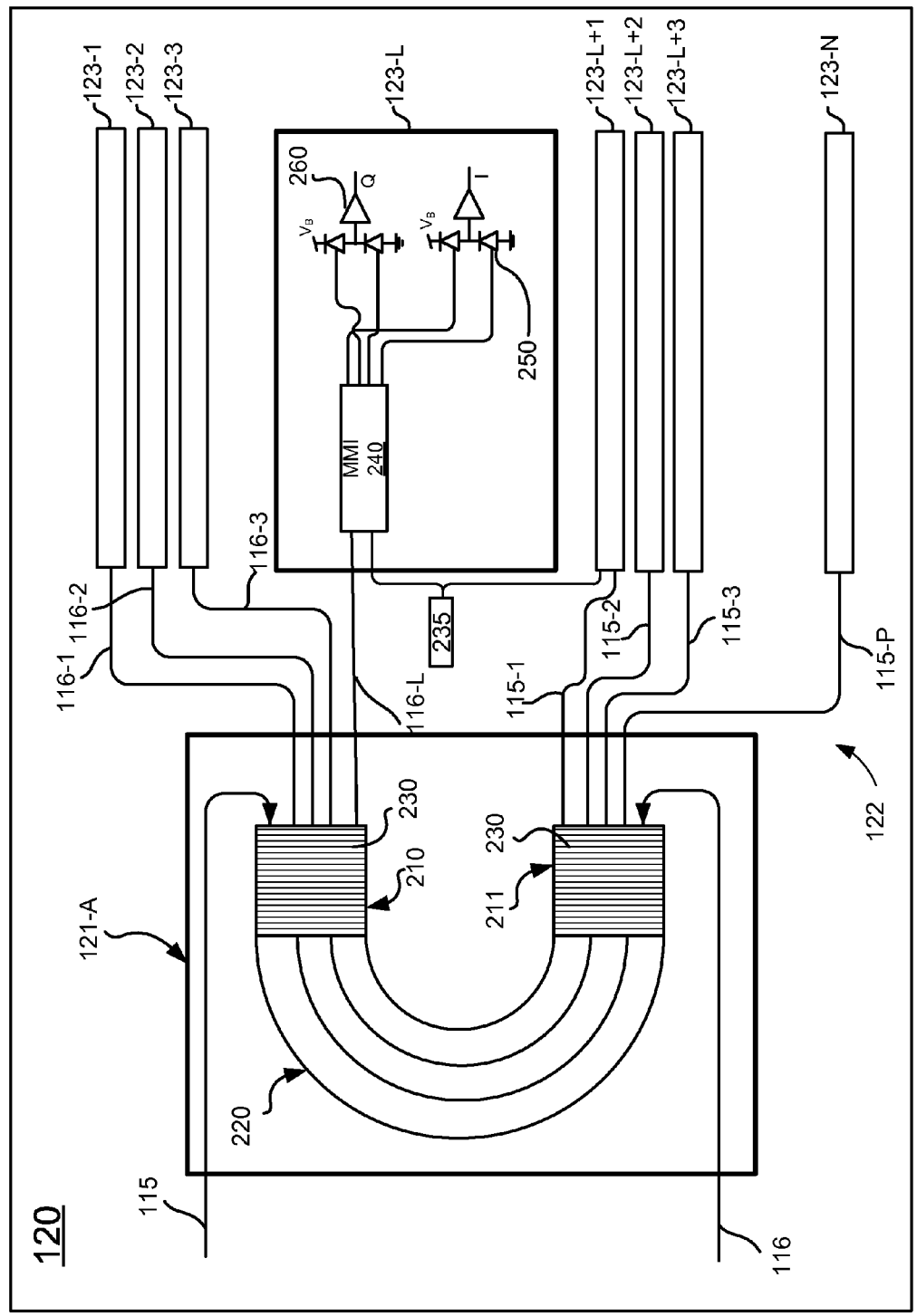
FIG. 2B is a diagram illustrating example components of a receiver module as shown in FIG. 1.

FIG. 2B is a diagram illustrating example components of receiver module 120 as shown in FIG. 1. In practice, receiver module 120 may include additional, fewer, or differently arranged elements than are shown in FIG. 2B.

As shown in FIG. 2B, receiver module 120 may include optical demultiplexer 121-A, waveguides 122, local oscillator 235, and/or optical receivers 123. Optical demultiplexer 121-A may include slab 210, slab 211, and/or waveguides 220 connected to slabs 210 and 211. In some implementations, slabs 210 and 211 may each include an input and an output. For example, slab 210 may receive an input (e.g., optical signal 115) and slab 211 may receive an input (e.g., optical signal 116). Waveguides 220 may supply slab 210 with output signal channels associated with the input of slab 211. Further, waveguides 220 may supply slab 211 with output signal channels associated with the input of slab 210.

In some other implementation, slab 210 and/or slab 211 may include an input, but may not include an output. Alternatively, slab 210 and/or 211 may include an output, but may not include an input. For example, slab 210 may include an input to receive optical signal 115 (e.g., from optical multiplexer 114). Slab 211 may include an output to supply signal channels associated with the input of slab 210. Alternatively, slab 211 may include an input to receive optical signal 116 (e.g., from optical multiplexer 114). Slab 210 may include an output to supply a signal channels associated with the input of slab 211.

While the implementations may be described as optical demultiplexer 121 receiving optical signals 115 and 116 provided by optical multiplexer 114 (e.g., WDM signals), in practice, it will be apparent that optical signals 115 and 116 may correspond to any type of optical signal. For example, optical signals 115 and 116 may refer to optical signals provided by a polarization beam splitter, a rotator, or some other optical device.

Slabs 210 and 211 may each include a free-space region (e.g., a propagation region). The free-space regions of slabs 210 and 211 may allow the wavelengths, associated with input signals, to propagate freely. Slab 210 may receive optical signal 115, thereby allowing wavelengths of optical signal 115 to propagate in the free-space region of slab 210. Waveguides 220 may guide individual signal channels associated with optical signal 115 and supply the individual signal channels to slab 211. Slab 211 may receive optical signal 116, thereby allowing wavelengths of optical signal 116 to propagate in the free-space region of slab 211. Waveguides 220 may guide individual signal channels, associated with optical signal 116, and supply the individual signal channels to slab 210.

As shown in FIG. 2B, slabs 210 and 211 may supply respective signal channels to optical receivers 123, via waveguides 122. Waveguides 122 may include individual waveguides associated with individual signal channels outputted by slabs 210 and 211. For example, waveguides 122 may include corresponding waveguides to transmit signal channels 116-1, 116-2, 116-3 . . . 116-L (where L≥1), associated with optical signal 116, to optical receivers 123-1, 123-2, 123-3 . . . 123-L, respectively. Additionally, waveguides 122 may include individual waveguides associated with individual signal channels associated with optical signal 115. For example, waveguides 122 may include corresponding waveguides to transmit signal channels 115-1, 115-2, 115-3 . . . 115-P (where P≥1), associated with optical signal 115, to optical receivers 123-L+1, 123-L+2, 123-L+3 . . . 123-N (where N≥1), respectively.

In some implementations, slab 210 and/or slab 211 may include material 230 (e.g., to form a polarizer on the respective slab). As described above, material 230 may absorb components of a signal channel, WDM signal, and/or some other optical signal having a particular polarization when the optical signal passes through the respective slab having material 230. For example, as described above, slabs 210 and 211 may receive optical signals 115 and 116 from optical multiplexer 114-A, and may supply corresponding signal channels. Material 230 may absorb components of the received WDM signals having a particular polarization (e.g., a TE or TM polarization). Further, material 230 may absorb components of the supplied corresponding signal channels having a particular polarization.

Local oscillator 235 may include a laser, a collection of lasers, or some other device. In some implementations, local oscillator 235 may include a laser to provide an optical signal to optical receivers 153. In some implementations, local oscillator 235 may include a single-sided laser to provide an optical signal to a coupler. In some other implementations, local oscillator 235 may include a double-sided laser to provide optical signals to respective optical receivers 123. Receiver module 120 may include multiple local oscillators 235, to provide optical signals to respective optical receivers 123.

Local oscillator 235 may provide a coherent detection system for optical receivers 123. (e.g., to allow optical receivers 123 to reconstruct a received optical signal having crosstalk or dispersion). For example, local oscillator may provide optical receiver 123-L with a phase reference signal, such that optical receiver 123-L may reconstruct a received signal (e.g., signal channel 116-L supplied by optical demultiplexer 121-A) that may include linear crosstalk and/or dispersion.

As further shown in FIG. 2B, optical receivers 123 may each include multi-mode interference (MMI) coupler 240, photodiodes 250, and transimpedence amplifiers (TIAs) 260. Additionally, or alternatively, optical receivers 123 may include additional, fewer, or differently arranged components than shown in FIG. 2B.

MMI coupler 240 may include an optical device to receive a signal channel supplied by optical demultiplexer 151 and/or an optical signal from local oscillator 220. In some implementations, MMI coupler 240 may supply multiple signals associated with the received signal channel and optical signal to photodiodes 250.

Photodiodes 250 may receive optical outputs from MMI coupler 240 and convert the optical outputs to corresponding electrical signals. In some implementations, photodiodes 250 may be arranged in pairs and connected to one another in a balanced configuration. The output of each balanced pair may supply one of a quadrature (Q) or in-phase (I) electrical signal, which is amplified by one of TIAs 260.

TIAs 260 may include an amplifier device, or some other device. In some implementations, TIAs 260 may receive electrical signals from photodiodes 250. TIAs 260 may amplify quadrature (Q), in-phase (I), and/or some other type of electrical signal.

Figure 3:
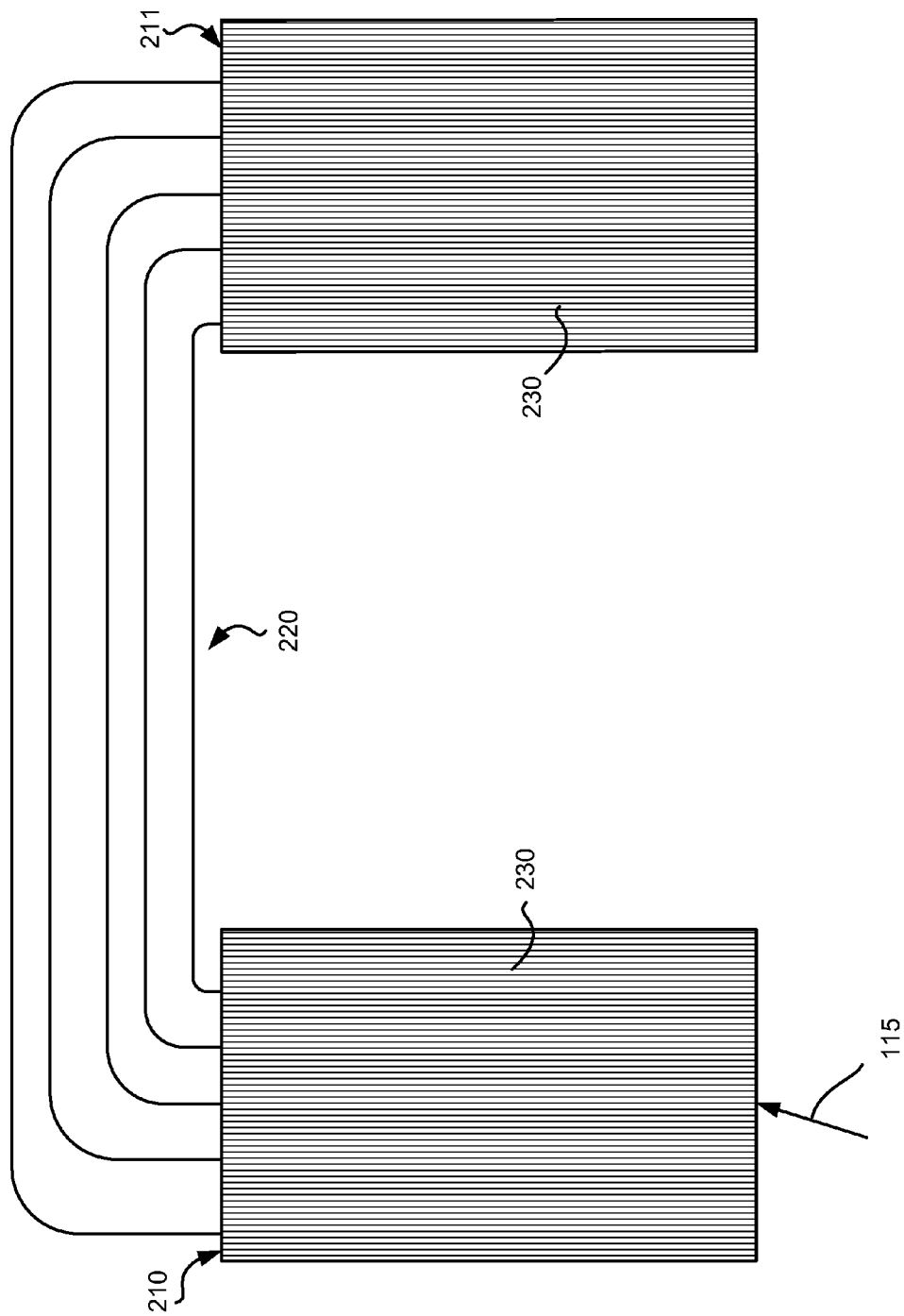
FIG. 3 is a diagram illustrating a top view of an example optical multiplexer or optical demultiplexer as shown in FIG. 1.

FIG. 3 is a diagram illustrating a top view of an example optical multiplexer 114 or optical demultiplexer 121 as shown in FIG. 1. As shown in FIG. 3, optical multiplexer 114 or optical demultiplexer 121 may include slabs 210 and 211. In some implementations, slabs 210 and 211 may be constructed in a substantially rectangular form. In some other implementation, slabs 210 and 211 may be constructed as some other shape (e.g., a square, a triangle, etc.). Slabs 210 and 211 may each include material 230, as described above (e.g., to provide a polarizer to absorb components having a particular polarization). Further, as shown in FIG. 3, slab 210 may receive an optical signal (e.g., optical signal 115, optical signal 116, signal channel 115-1, signal channel 116-1, or some other optical signal).

Figure 4:
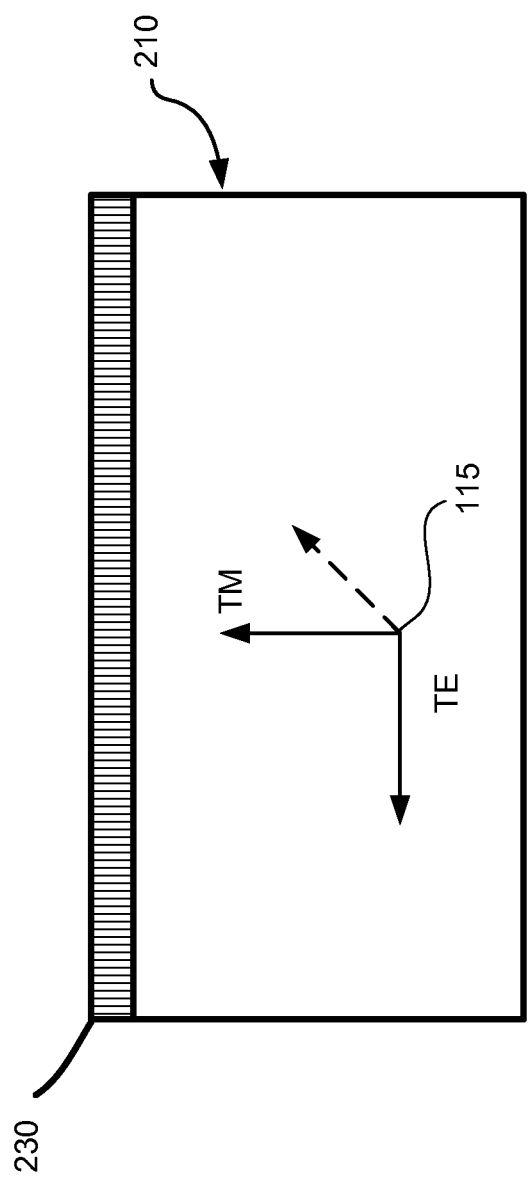
FIG. 4 is a diagram illustrating a front view of a slab for a multiplexer or demultiplexer as shown in FIG. 3.

FIG. 4 is a diagram illustrating a front view of slab 210 for optical multiplexer 114 or optical demultiplexer 121 as shown in FIG. 3. Slab 210 may include a layer of material 230 provided on the top surface of slab 210 and having a thickness. In some implementations, slab 210 may function as a TE polarizer and may absorb components having a TM polarization.

As shown in FIG. 4, slab 210 may receive optical signal 115. Optical signal 115 may include first components having a first polarization (e.g., a TM polarization), and second components having a second polarization (e.g., a TE polarization).

As shown in FIG. 4, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TM polarization may contact material 230, thereby causing material 230 to absorb components having the TM polarization. As a result, components having the TM polarization may be absorbed while components having the TE polarization pass through slab 210.

While the example implementation of FIG. 4 is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 5:
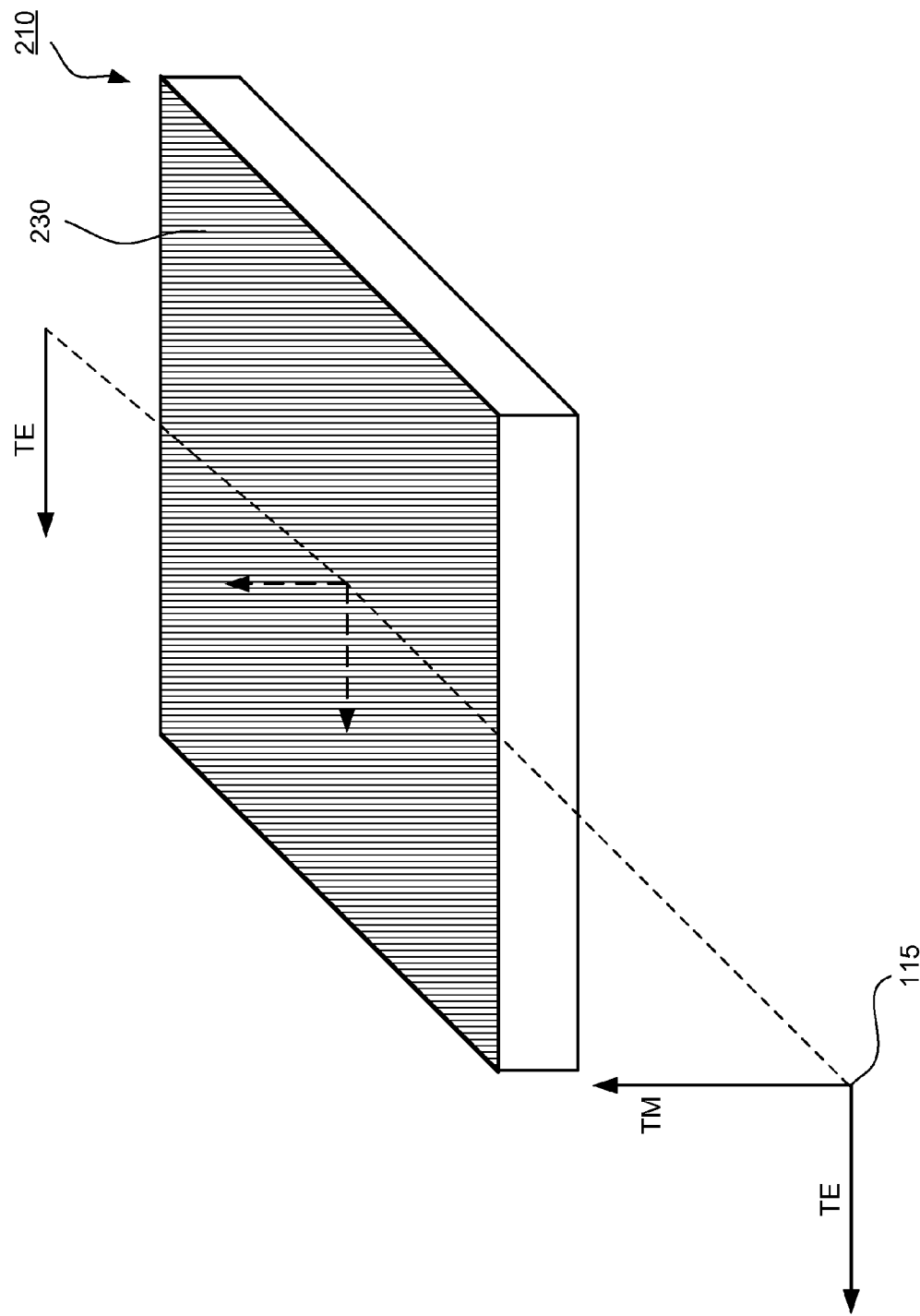
FIG. 5 is a diagram illustrating an isometric view of a slab for the multiplexer or demultiplexer as shown in FIG. 3.

FIG. 5 is a diagram illustrating an isometric view of slab 210 for optical multiplexer 114 or optical demultiplexer 121 as shown in FIG. 3. In some implementations, slab 210 may function as a TE polarizer. Slab 210 may include a layer of material 230 having a thickness. In some implementations material 230 may be formed on a top surface of slab 210.

As shown in FIG. 5, slab 210 may receive optical signal 115. In some other implementations, slab 210 may receive some other optical signal (e.g., optical signal 116, signal channel 115-1, signal channel 116-1, etc.). Optical signal 115 may include first components having a first polarization (e.g., a TM polarization), and second components having a second polarization (e.g., a TE polarization).

As further shown in FIG. 5, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TM polarization may contact material 230, thereby causing material 230 to absorb components having the TM polarization. As a result, components having the TM polarization may be absorbed while components having the TE polarization pass through slab 210.

While the example implementation of FIG. 5 is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 6:
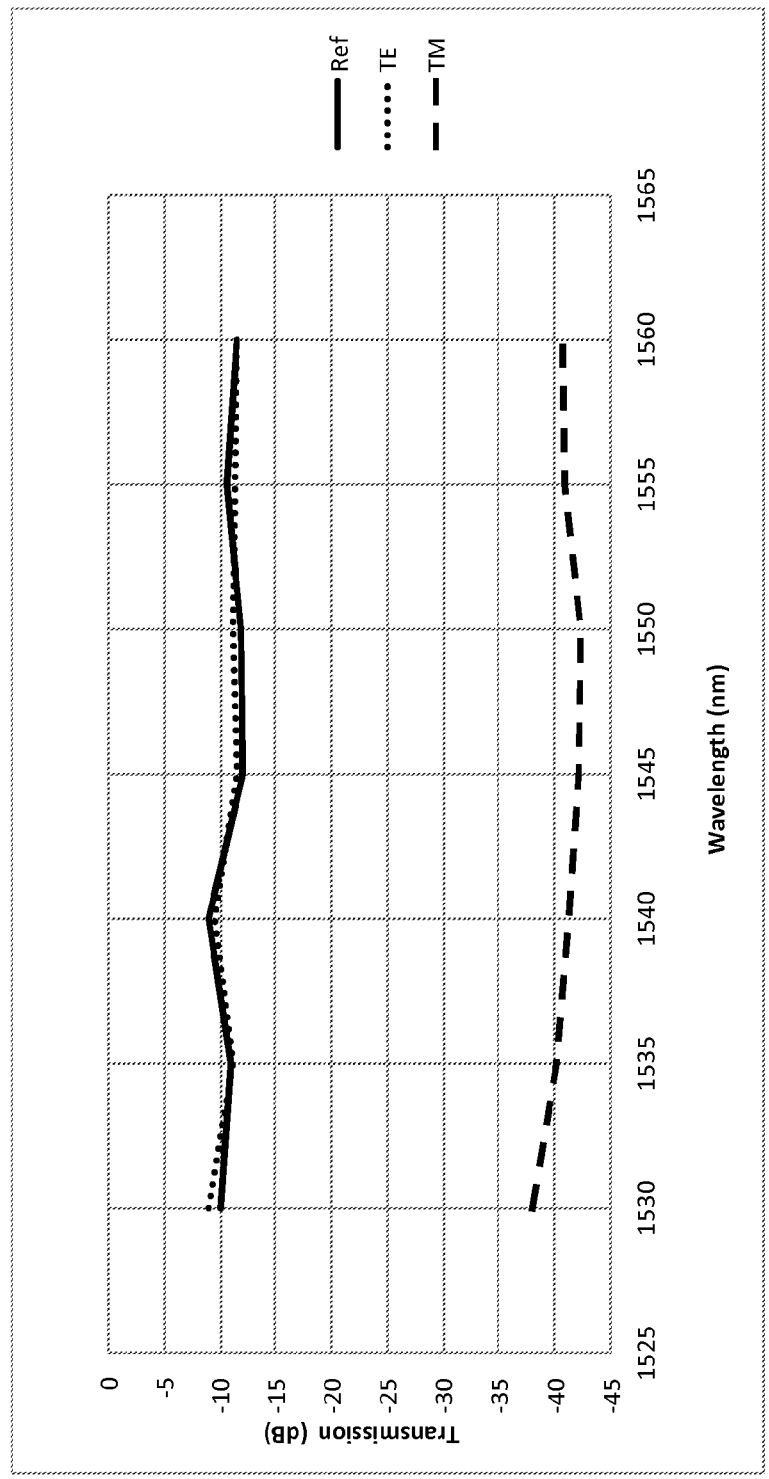
FIGS. 6-7 are graphs illustrating transmission characteristics, associated with an optical signal, transmitted via the multiplexer or demultiplexer as shown in FIG. 3.
Figure 7:
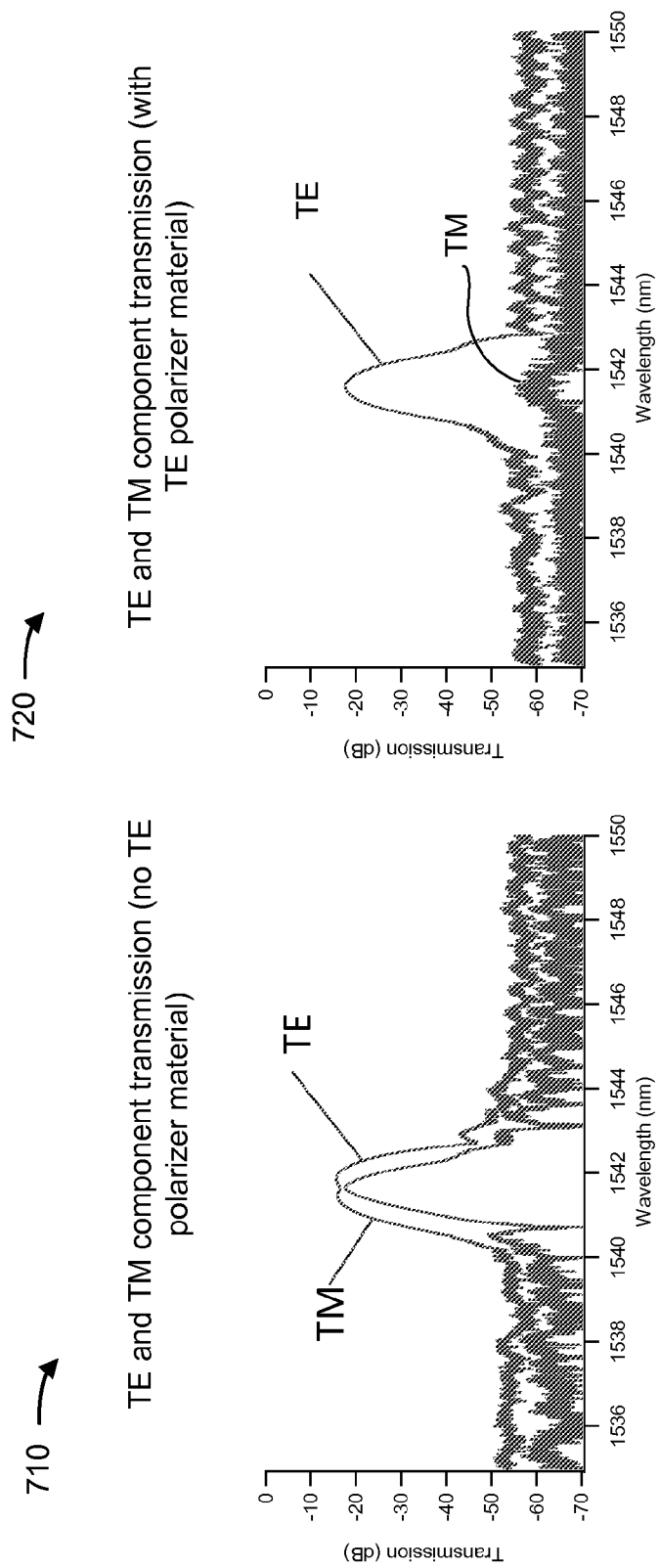

FIGS. 6-7 are graphs illustrating transmission characteristics, associated with an optical signal, transmitted via optical multiplexer 114 or optical demultiplexer 121 as shown in FIG. 3. In some implementations, the graphs in FIGS. 6-7 may describe transmission characteristics for components associated with slab 210 of optical multiplexer 114 and/or optical demultiplexer 121, and/or slab 211 of optical multiplexer 114 and/or optical demultiplexer 121.

In FIG. 6, assume that a slab (e.g., slab 210 or slab 211) receives an optical signal (e.g., signal channel 115-1, optical signal 115, and/or some other optical signal). Further assume that the slab includes a polarizer (e.g., a TE polarizer) in the form of material 230 provided on the slab. As shown in FIG. 6, components having the TE polarization may pass through the slab, as represented by a minimal transmission loss (e.g., in relation to a reference component) of components having the TE polarization. As further shown in FIG. 6, components having the TM polarization may be absorbed (e.g., by material 230 as described above), as represented by a substantial transmission loss (e.g., in relation to the reference component) of components having the TM polarization.

In FIG. 7, assume that a slab (e.g., slab 210 or slab 211) receives an optical signal (e.g., signal channel 115-1, optical signal 115, and/or some other optical signal). In graph 710, further assume that the slab does not include a TE polarizer. As shown in graph 710, first components of the optical signal having the TM polarization and second components of the optical signal having the TE polarization may pass through the slab, as represented by a substantial parabolic progression of the transmission of the first components and the second components through the slab.

In graph 720, assume that a slab (e.g., slab 210 or slab 211) includes a polarizer (e.g., a TE polarizer) in the form of material 230 provided on the slab. As shown in graph 720, components having the TE polarization may pass through the slab, as represented by a substantial parabolic progression of transmission of the components through the slab. As further shown in diagram 720, components having the TM polarization may be absorbed (e.g., by material 230 as described above), as represented by a minimal progression of the transmission of components having the TM polarization.

Figure 8:
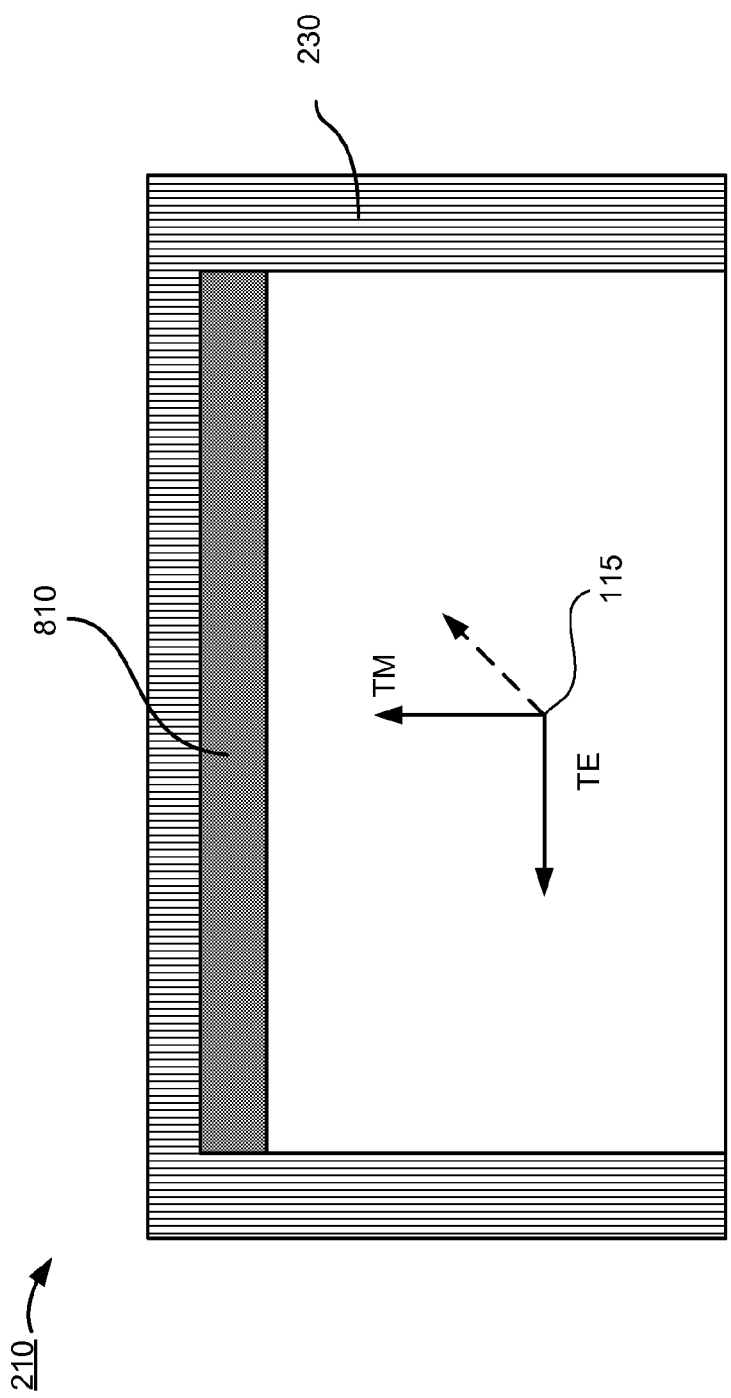
FIG. 8 is a diagram illustrating a front view of a for a multiplexer or demultiplexer as shown in FIG. 1.

FIG. 8 is a diagram illustrating a front view of a slab for optical multiplexer 114 or optical demultiplexer 121 as shown in FIG. 3. In some implementations, slab 210 may function as a TM polarizer and may absorb components having a TE polarization. For example, slab 210 may include a layer of material 230 having a thickness formed on a top surface and/or side surfaces of slab 210 to absorb components having a TE polarization. Slab 210 may also include material 810 having a thickness formed directly beneath material 230 on a top surface of slab 210. In some implementations, material 810 may include a nitride and/or some other material, to prevent components having the TM polarization from contacting material 230.

As shown in FIG. 8, slab 210 may receive optical signal 115. Optical signal 115 may include first components having a first polarization (e.g., a TM polarization), and second components having a second polarization (e.g., a TE polarization).

As further shown in FIG. 8, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TE polarization may contact material 230, thereby causing material 230 to absorb components having the TE polarization. The components of optical signal 115 having the TM polarization may contact material 810, such that the components having the TM polarization may not contact material 230. As a result, components having the TE polarization may be absorbed while components having the TM polarization may pass through slab 210.

While the example implementation of FIG. 8 is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 9:
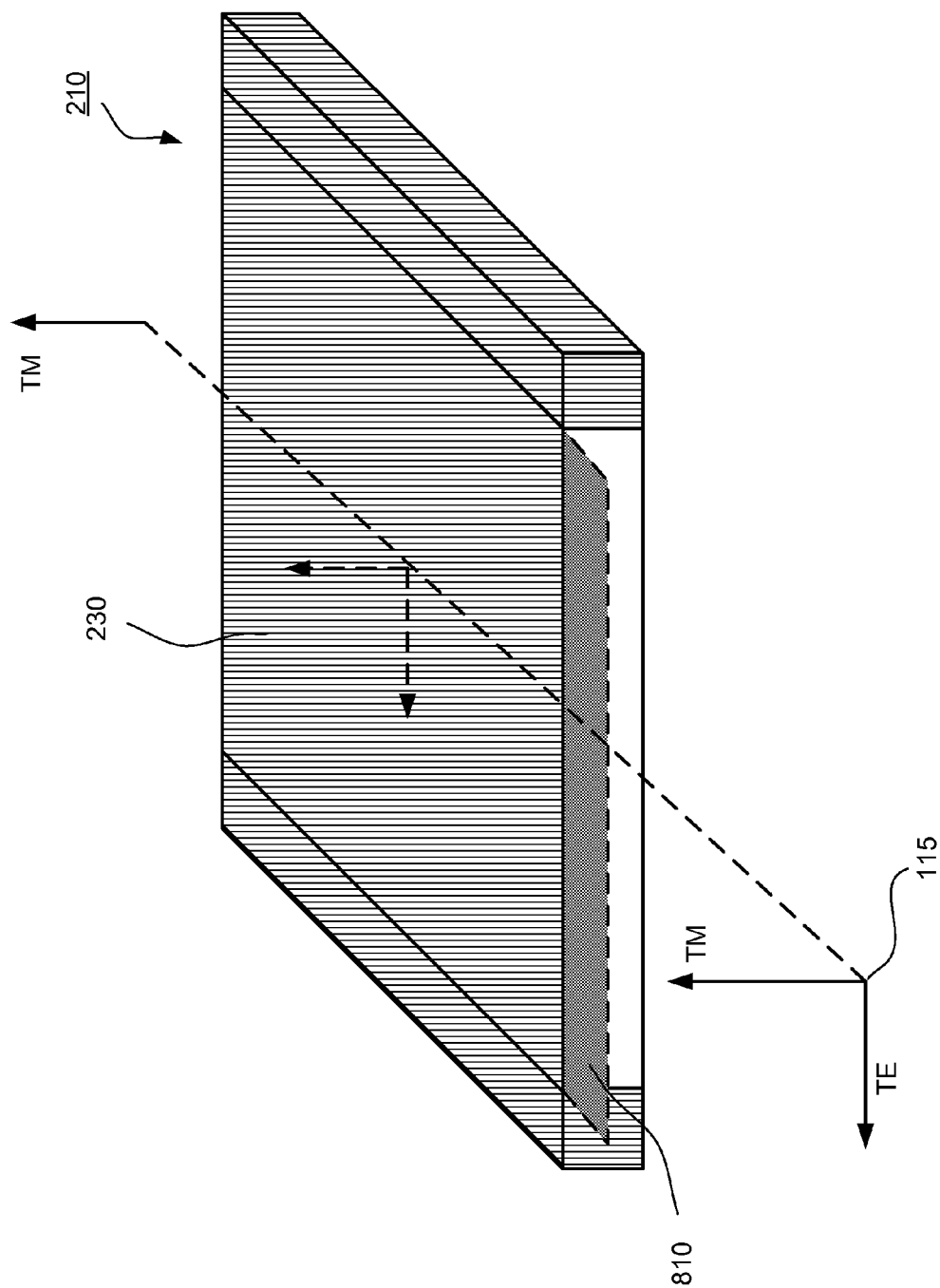
FIG. 9 is a diagram illustrating an isometric view of a slab for a multiplexer or demultiplexer as shown in FIG. 8.

FIG. 9 is a diagram illustrating an isometric view of a slab 210 for optical multiplexer 114 or optical demultiplexer 121. In some implementations slab 210 may function as a TM polarizer. Slab 210 may include a layer of material 230 having a thickness formed on a top surface and/or side surfaces of slab 210 to absorb components having a TE polarization. Slab 210 may also include material 810 having a thickness formed directly beneath material 230 on a top surface of slab 210.

As shown in FIG. 9, slab 210 may receive optical signal 115. Optical signal 115 may include first components having a first polarization (e.g., a TM polarization), and second components having a second polarization (e.g., a TE polarization).

As further shown in FIG. 9, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TE polarization may contact material 230, thereby causing material 230 to absorb components having the TE polarization. The components of optical signal 115 having the TM polarization may contact material 810, such that the components having the TM polarization may not contact material 230. As a result, components having the TE polarization may be absorbed while components having the TM polarization may pass through slab 210.

While the example implementation of FIG. 9 is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 10:
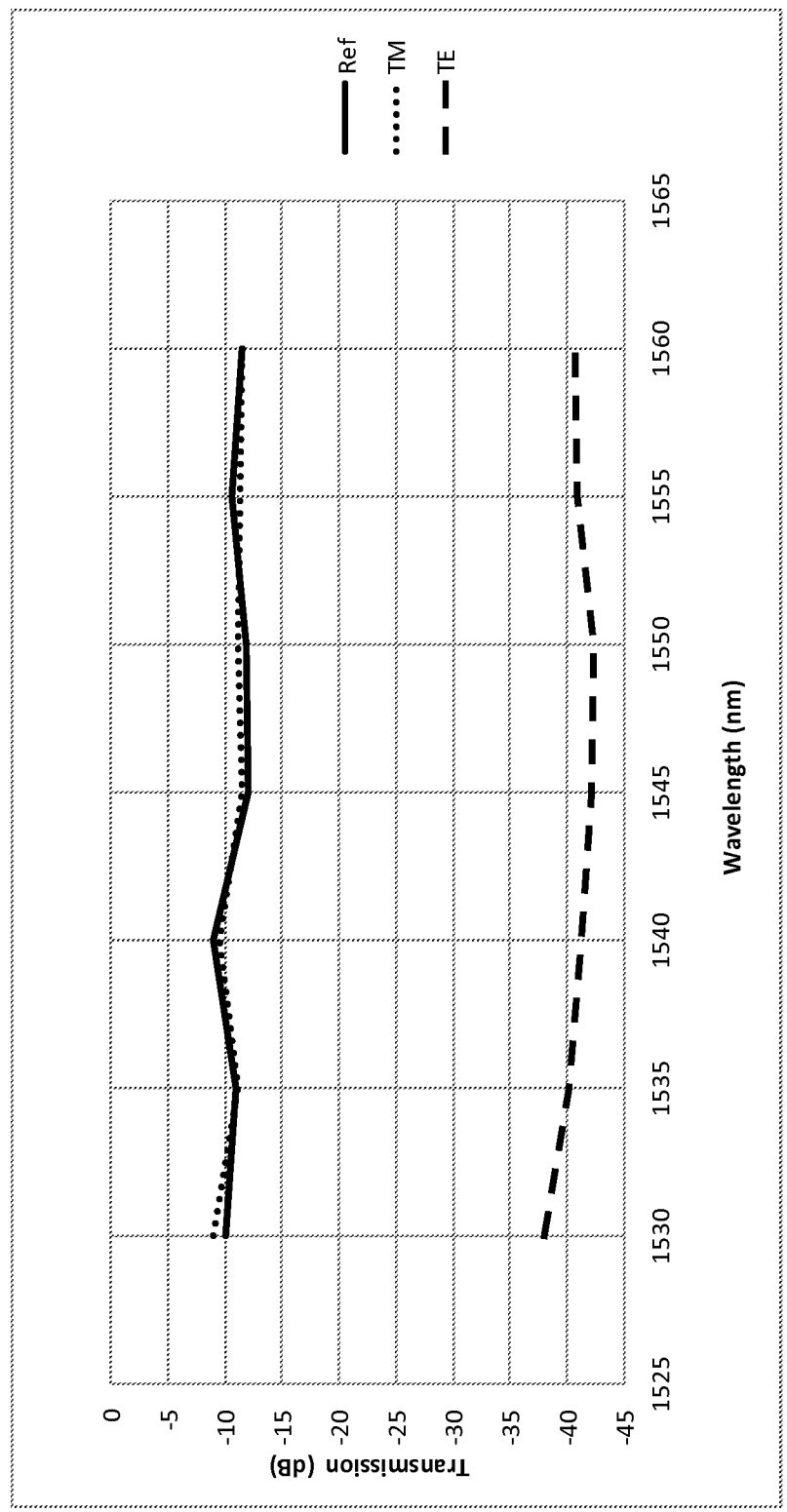
FIGS. 10-11 are diagrams illustrating transmission characteristics associated with an optical signal transmitted via the multiplexer or the demultiplexer as shown in FIG. 8.
Figure 11:
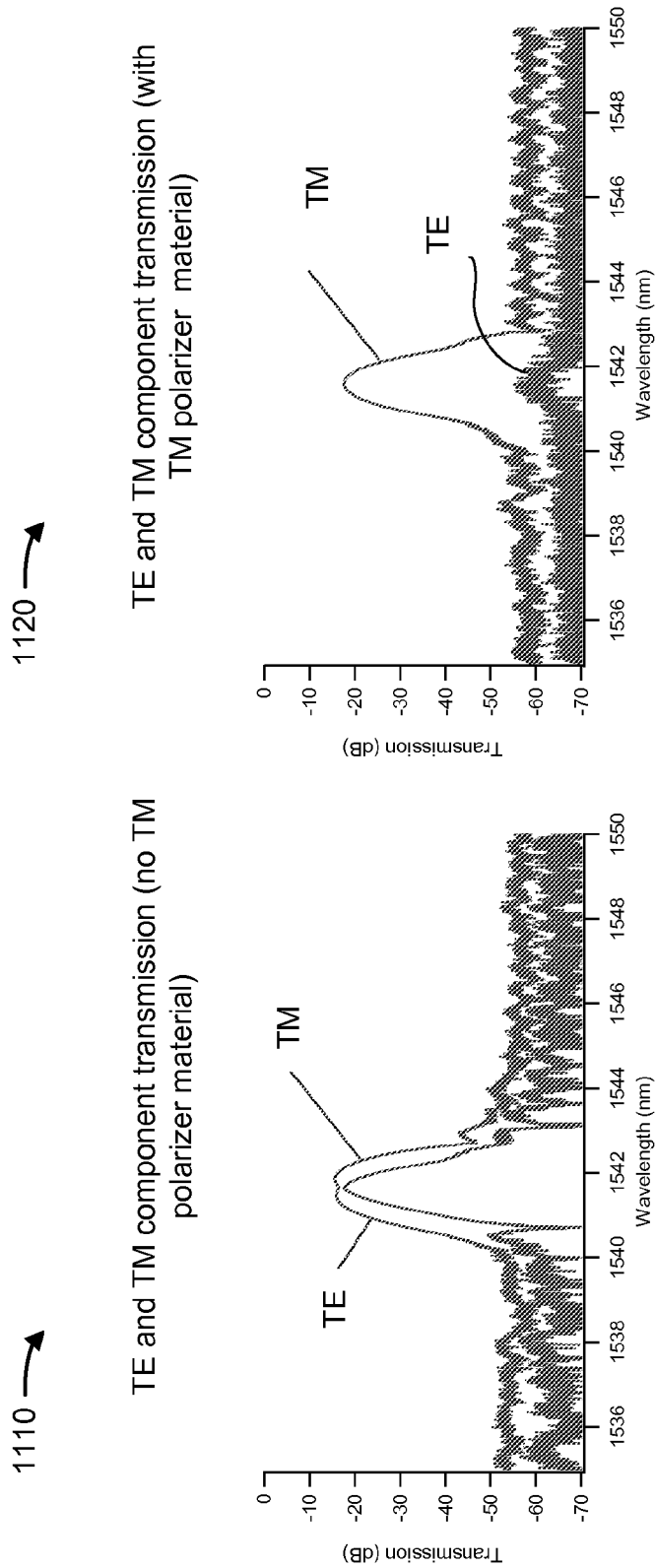

FIGS. 10-11 are graphs illustrating transmission characteristics associated with an optical signal transmitted via the multiplexer or the demultiplexer as shown in FIG. 8. In some implementations, the graphs in FIGS. 10-11 may describe transmission characteristics for components associated with slab 210 of optical multiplexer 114 and/or optical demultiplexer 121, and/or slab 211 of optical multiplexer 114 and/or optical demultiplexer 121.

In FIG. 10, assume that a slab (e.g., slab 210 or slab 211) receives an optical signal (e.g., signal channel 115-1, optical signal 115, and/or some other optical signal). Further assume that the slab includes a polarizer (e.g., a TM polarizer) in the form of material 230 and/or material 810 provided on the slab. As shown in FIG. 10, components having the TM polarization may pass through the slab, as represented by a minimal transmission loss (e.g., in relation to a reference component) of components having the TM polarization. As further shown in FIG. 10, components having the TE polarization may be absorbed (e.g., by material 230 as described above), as represented by a substantial transmission loss (e.g., in relation to the reference component) of components having the TE polarization.

In FIG. 11, assume that a slab (e.g., slab 210 or slab 211) receives an optical signal (e.g., signal channel 115-1, optical signal 115, and/or some other optical signal). In graph 1110, further assume that the slab does not include a TM polarizer. As shown in graph 1110, first components of the optical signal having the TM polarization and second components of the optical signal having the TE polarization may pass through the slab, as represented by a substantial parabolic progression of the transmission of the first components and the second components through the slab.

In graph 1120, assume that a slab (e.g., slab 210 or slab 211) includes a polarizer (e.g., a TM polarizer) in the form of material 230 and material 810 provided on the slab, as described above. As shown in graph 1120, components having the TM polarization may pass through the slab, as represented by a substantial parabolic progression of transmission of the components through the slab. As further shown in diagram 1120, components having the TE polarization may be absorbed (e.g., by material 230 as described above), as represented by a minimal progression of the transmission of components having the TE polarization.

In some implementations, optical multiplexer 114 and/or optical demultiplexer 121 may include a shared propagation region (e.g., a single slab functioning as slabs 210 and 211). In an example implementation, the shared propagation region may include material 230 and/or material 810 (e.g., to form a polarizer on the slab, associated with the shared propagation region). In another example implementation, the shared propagation region may not include material 230 and/or material 810.

In some implementations, providing a multiplexer or demultiplexer with slab having a shared propagation region may reduce the size of the multiplexer or demultiplexer. As a result, additional multiplexers or demultiplexers may be provided in a WDM system to increase data rates and/or processing capacity, associated with the WDM system.

Figure 12A:
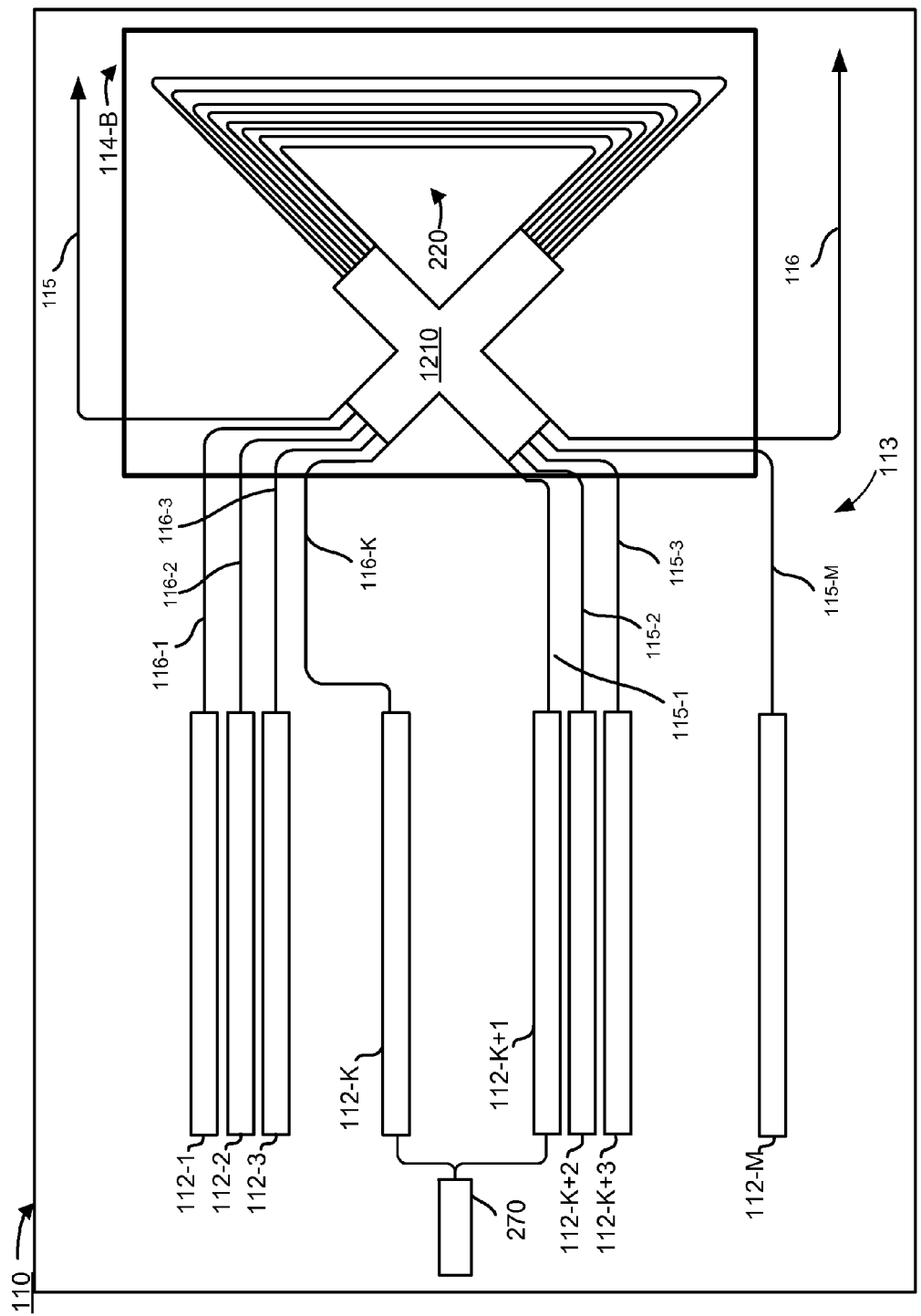
FIG. 12A is a diagram illustrating example elements of a transmitter module according to an implementation described herein.

FIG. 12A is a diagram illustrating example elements of transmitter module 110 according to an implementation described herein. In practice, transmit module 110 may include additional, fewer, or differently arranged elements than are shown in FIG. 12A.

Transmitter module 110 may include optical transmitters 112, waveguides 113, and/or optical multiplexer 114-B. In some implementations, elements of transmitter module 110 may correspond to elements of transmitter module 110 as shown in FIG. 2A.

Optical multiplexer 114-B may include slab 1210 having a single propagation region (e.g., a free-space region). Slab 1210 may have a first propagation section and a second propagation section, such that a portion of the first propagation section and a portion of the second propagation section overlap each other to form a shared propagation section. The first propagation section and the second propagation section may each have a first end and a second end. Waveguides 220 may connect the second end of the first propagation section with the second end of the second propagation section.

In some implementations, and as shown in FIG. 12A, the first propagation section may receive multiple inputs (e.g., signal channels via waveguides 116-1, 116-2, 116-3 . . . 116-K from optical transmitters 112), with each input having a different wavelength. The first propagation section may include a free space to allow the received inputs to propagate into respective first ends of waveguides 220 connected to the first propagation section. Additionally, waveguides 220 may each have different lengths, such that each waveguide 220 applies a different phase shift to the received inputs. Further, waveguides 220 may supply the received inputs to the second propagation section having a free space. The received inputs may propagate in the free space, associated with the second propagation section, in such a way that the second propagation section supplies a single combined output (e.g., optical signal 116) associated with the received inputs. The second propagation section may also receive multiple inputs (e.g. signal channels via waveguides 115-1, 115-2, 115-3 . . . 115-M) such that the first propagation section outputs a single combined output (e.g., optical signal 115) associated with the inputs received by the second propagation section.

Figure 12B:
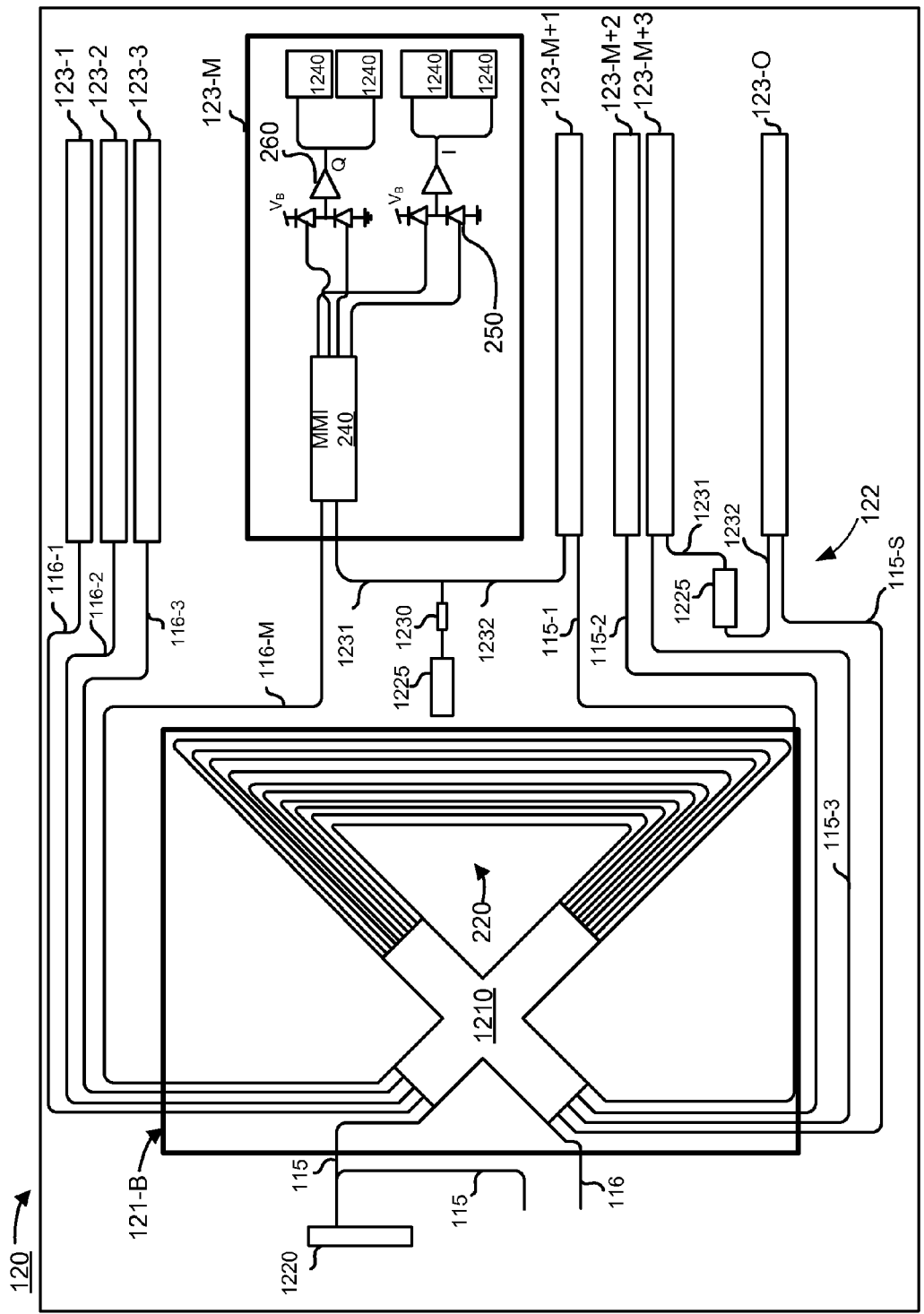
FIG. 12B is a diagram illustrating example elements of a receiver module according to an implementation described herein.

FIG. 12B is a diagram illustrating example elements of receiver module 120 according to an implementation described herein. In practice, receiver module 120 may include additional, fewer, or differently arranged elements than are shown in FIG. 12B. In some implementations, elements of receiver module 120 may correspond to elements of receiver module 120 as shown in FIG. 2B.

As shown in FIG. 12B, receiver module 120 may include optical demultiplexer 121-B, waveguides 122, optical receivers 123, rotator 1220 local oscillator 1225, and/or coupler 1230.

Rotator 1220 may include an optical device or a collection of optical devices. In some implementations, rotator 1220 may receive optical signal 115 with components having a first polarization (e.g., a TM polarization). Rotator 1220 may rotate the polarization, associated with components of optical signal 115, and supply optical signal 115 such that optical signal 115 has components having a second polarization (e.g., a TE polarization). Rotator 1220 may supply optical signal 115 (e.g., an optical signal with components having the second polarization) to optical demultiplexer 121-B. In some implementations, rotator 1220 may supply optical signal 115 having components of the same polarization as optical signal 116. As a result, optical demultiplexer 121-B may receive optical signals with components having one polarization (i.e., the second polarization).

In some implementations, rotator 1220 may be capable of receiving multiple optical signals 115, rotating the first components associated with the multiple optical signals 115 and supplying multiple optical signals 115 having the second polarization.

Optical demultiplexer 121-B may include one or more waveguides 220 similar to those as described above with respect to optical demultiplexer 121-B. In some implementations, it may be desirable to reduce the number of waveguides 220 (e.g., to reduce the size of optical demultiplexer 121-B). In some implementations, reducing the number of waveguides 220 may cause waveguides 220 to create linear crosstalk between output signals (e.g., signal channels supplied by optical demultiplexer 121-B).

Optical demultiplexer 121-B may include slab 1210 and waveguides 220 connected to slab 1210 in an arrangement as described above. In some implementations, and as shown in FIG. 12B, the first propagation section of slab 1210 may receive an input (e.g., optical signal 115 supplied by rotator 1220) with components having a different wavelength. The first propagation section may include a free space to allow components of optical signal 115 to propagate into respective first ends of waveguides 220 connected to the first propagation section. Additionally, waveguides 220 may each have different lengths, such that each waveguide applies a different phase shift to components of optical signal 115. Further, waveguides 220 may supply components of optical signal 115 to the second propagation section of slab 1210. The components of optical signal 115 may propagate in the free space, associated with the second propagation section, in such a way that the second propagation section supplies multiple signal channels (e.g., signal channels corresponding to waveguides 115-1, 115-2, 115-3 . . . 115-S), associated with the received inputs. The second propagation section may also receive an optical signal (e.g. optical signal 116) such that the first propagation section supplies multiple signal channels (e.g. via waveguides 116-1, 116-2, 116-3 . . . 116-M) associated with optical signal 116 received by the first propagation section.

Local oscillator 1225 may include a laser, a collection of lasers, or some other device. In some implementations, local oscillator 1225 may include a laser to provide an optical signal (e.g., optical signal 1231 and/or optical signal 1232) to respective optical receivers 123. In some implementations, local oscillator 1225 may include a single-sided laser to provide an optical signal to coupler 1230. In some other implementations, local oscillator 1225 may include a double-sided laser to provide optical signals 1231 and 1232. Each one of optical signals 1231 and 1232 may be received by respective optical receivers 123. Receiver module 120 may include multiple local oscillators 1225, to provide optical signals to respective optical receivers 123.

Coupler 1230 may include a power splitter, a power coupler, a collection of power splitters or power couplers, or some other type of device. In some implementations, coupler 1230 may receive an optical signal from local oscillator 1225. Coupler 1230 may supply multiple optical signals (e.g., optical signal 1231 and/or optical signal 1232), associated with the input optical signal supplied by local oscillator 1225.

Local oscillator 1225 and/or coupler 1230 may provide a coherent detection system for optical receivers 123 (e.g., to allow optical receivers 123 to reconstruct a received optical signal having crosstalk or dispersion). For example, optical signal 1231 may provide optical receiver 123-M with a phase reference signal, such that optical receiver 123-M may reconstruct a received signal (e.g., signal channel 116-M supplied by optical demultiplexer 121-B) that may include linear crosstalk and/or dispersion.

Optical receivers 123 may include elements similar to those described above with respect to FIG. 2B. Optical receivers 123 may additionally include analog-to-digital (A/D) converters 1240. In some implementations, A/D converters 1240 may include a signal converting device, some other device, or a collection of devices. A/D converters 1240 may receive amplified electrical signals from TIAs 260, and convert the received electrical signals into digital signals. A/D converters 1240 may include a digital signal processor (DSP) device to process the converted digital signals and to reconstruct an optical signal received by a respective optical receiver 123 (e.g., signal channel 116-M).

Optical receivers 123 may each include an optical hybrid circuitry, a coherent detection circuitry, or some other circuitry, to allow optical receivers 123 to reconstruct received optical signals having linear crosstalk and/or dispersion. For example, assume that optical receiver 123-M receives an optical signal (e.g., signal channel 116-M). Further assume that signal channel 116-M includes linear crosstalk and/or dispersion. MMI coupler 240 may receive optical signal 116-M and a local oscillator signal (e.g., optical signal 1231) corresponding to a reference optical signal. MMI coupler 240 may supply multiple signals associated with the received optical signals (i.e., optical signal 116-M and optical signal 1231) to photodiodes 250. Photodiodes 250 may receive optical outputs from MMI coupler 240 and convert the optical outputs to corresponding electrical signals. TIAs 260 may amplify the electrical signals outputted by photodiodes 250, and output the amplified electrical signals to A/D converters 1230. A/D converters 1230 may supply and process digital signals, associated with the amplified electrical signals, and may reconstruct signal channel 116-M, based on processing the digital signals, associated with signal channel 116-M (i.e., a signal channel with crosstalk and/or dispersion), and with the reference signal (e.g., optical signal 1231).

Figure 13:
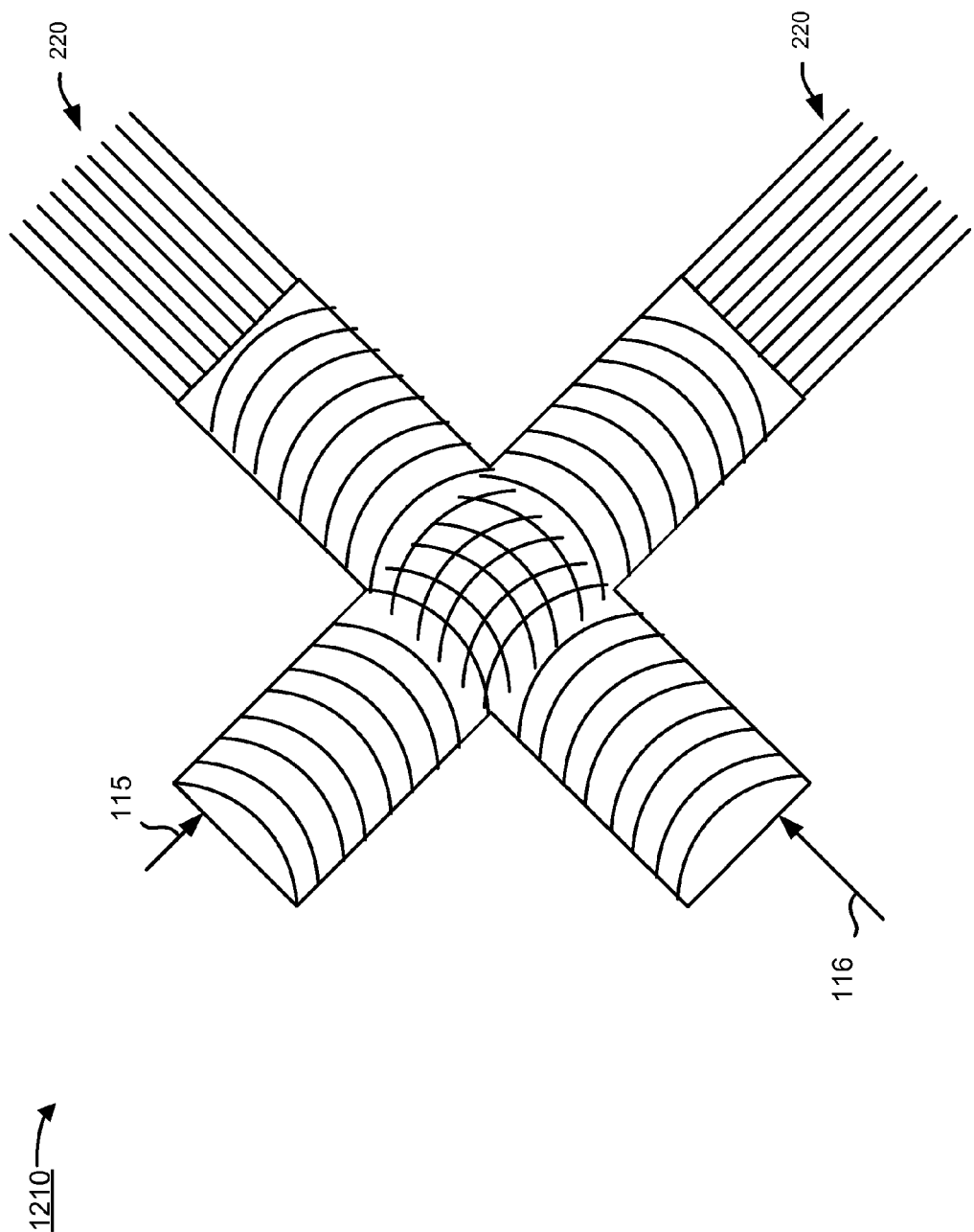
FIGS. 13-15 are diagrams illustrating a cross-section of slab for an optical demultiplexer shown in FIG. 12B.
Figure 14:
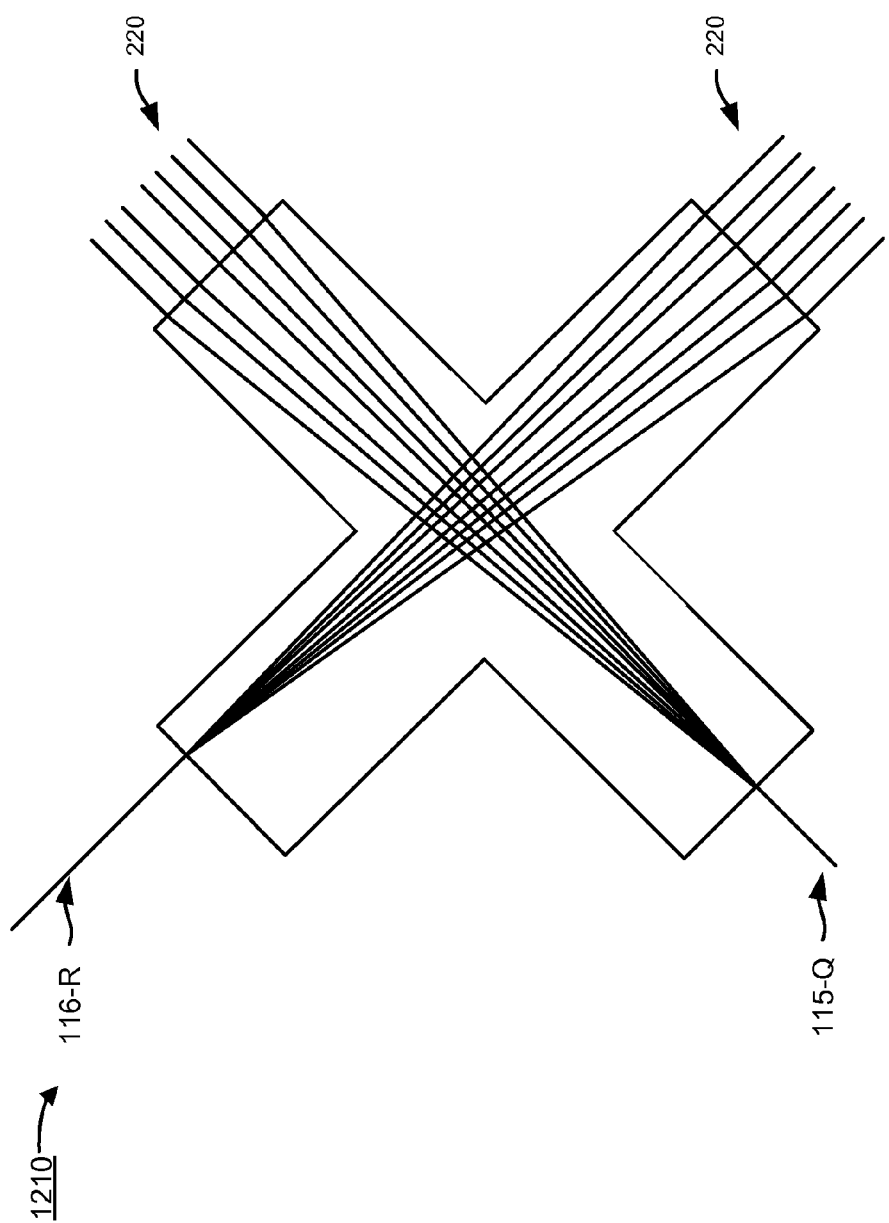
Figure 15:
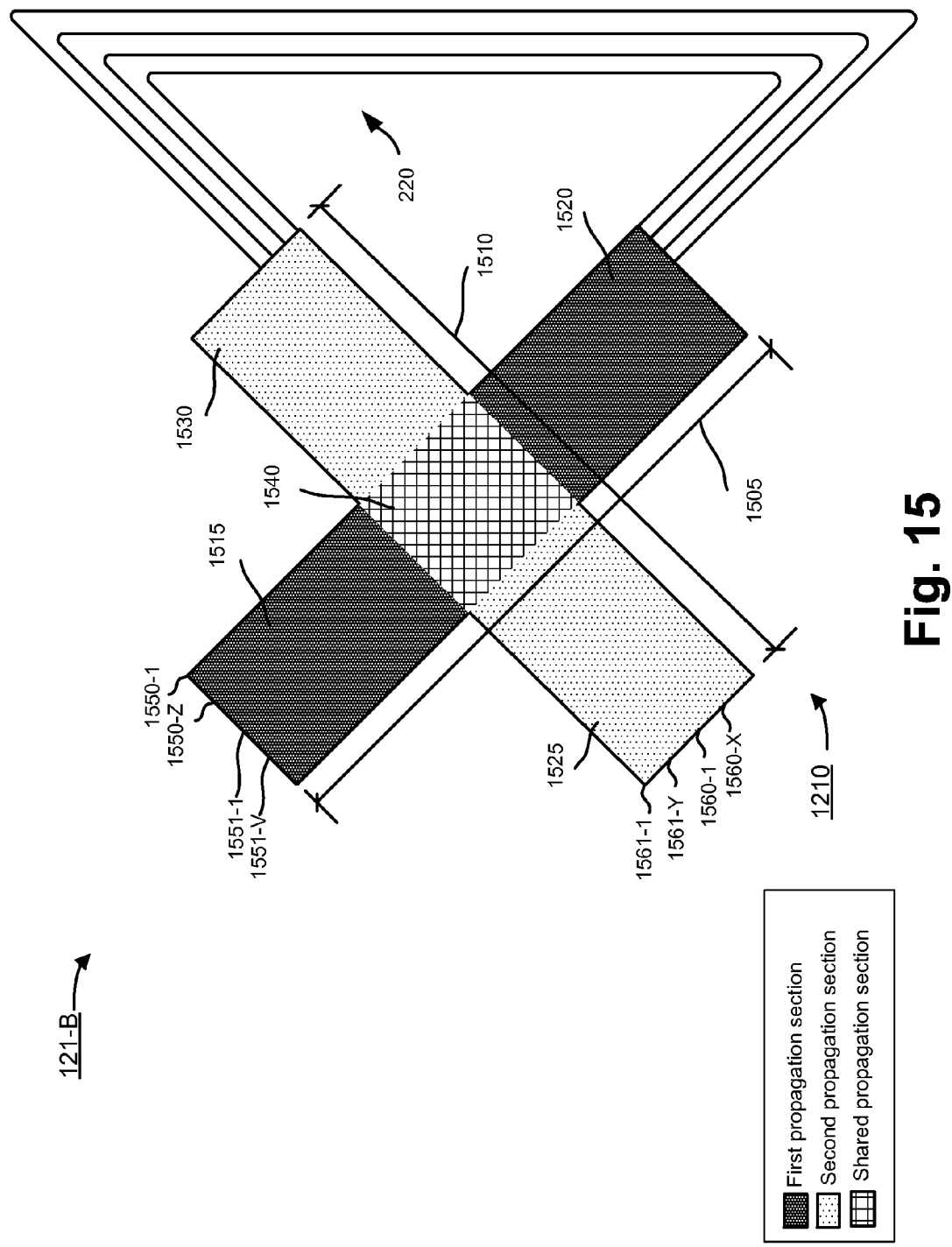

FIGS. 13-15 are diagrams illustrating a cross-section of slab 1210 for optical demultiplexer 121-B as shown in FIG. 12B. While FIGS. 13-15 are described in terms of slab 1210 being associated with optical demultiplexer 121 to receive optical signals 115 and 116 and supply signal channels associated with optical signal 115 and 116, in practice, it will be apparent that slab 1210 may be associated with optical multiplexer 114 to receive signal channels (e.g., signal channels associated with waveguides 115-1, 115-2, 115-3, etc.) and combined optical signals associated with the received signal channels. While a particular shape of slab 1210 is shown in FIGS. 13-15, in practice slab 1210 may have some other shape.

As shown in FIG. 13, slab 1210 may receive optical signal 115 via a first end of a first propagation section of slab 1210. Optical signal 115 may propagate through the first propagation section such that individual signal channels, associated with optical signal 115, may be received by respective first ends of waveguides 220 connected to a second end of the first propagation section. Additionally, slab 1210 may receive optical signal 116 via a first end of a second propagation section of slab 1210. Optical signal 116 may propagate through the second propagation section such that individual signal channels, associated with optical signal 116, may be received by respective second ends of waveguides 220 connected to a second end of the second propagation section.

As shown in FIG. 14, waveguides 220 may supply respective signal channels, associated with optical signal 115, to the first end of the second propagation section. For clarity, one signal channel is shown (i.e., signal channel 115-Q, where Q≥1). As described above, waveguides 220 may supply multiple signal channels associated with optical signal 116. Waveguides 220 may also supply respective signal channels associated with optical signal 116, to the first end of the first propagation section. For clarity, one signal channel is shown (i.e., signal channel 116-R, where R≥1). As described above, waveguides 220 may supply multiple signal channels associated with optical signal 116.

As shown in FIG. 15, slab 1210 may include a shared propagation region having a first propagation section 1505 and a second propagation section 1510. In some implementations, the shared propagation region of slab 1210 may be substantially X-shaped, V-shaped, or some other shape. First propagation section 1505 may include first end 1515, second end 1520, and shared propagation section 1540. Second propagation section 1510 may include first end 1525, second end 1530, and shared propagation section 1540. First propagation section 1505 and second propagation section 1510 may overlap to form shared propagation section 1540 including a portion of first propagation section 1505 and a portion of second propagation section 1510. Respective first ends of waveguides 220 may be connected to second end 1520 and respective second ends of waveguides 220 may be connected to second end 1530.

In some implementations, first end 1515 may include inputs 1550-1 through 1550-Z (where Z≥1) to receive respective optical signals (e.g., optical signal 115, signal channel 115-1, and/or some other optical signal). First end 1515 may also include outputs 1551-1 to 1551-V (where V≥1) to supply respective outputs associated with inputs of first end 1525 (e.g., optical signal 116, signal channel 116-1, and/or some other optical signal).

In some implementations, first end 1525 may include inputs 1560-1 through 1560-X (where X≥1) to receive respective optical signals (e.g., optical signal 116, signal channel 116-1, and/or some other optical signal). First end 1525 may also include outputs 1561-1 through 1561-Y (where Y≥1) to supply respective outputs associated with inputs of first end 1515 (e.g., optical signal 115, signal channel 115-1, and/or some other optical signal).

Figure 16A:
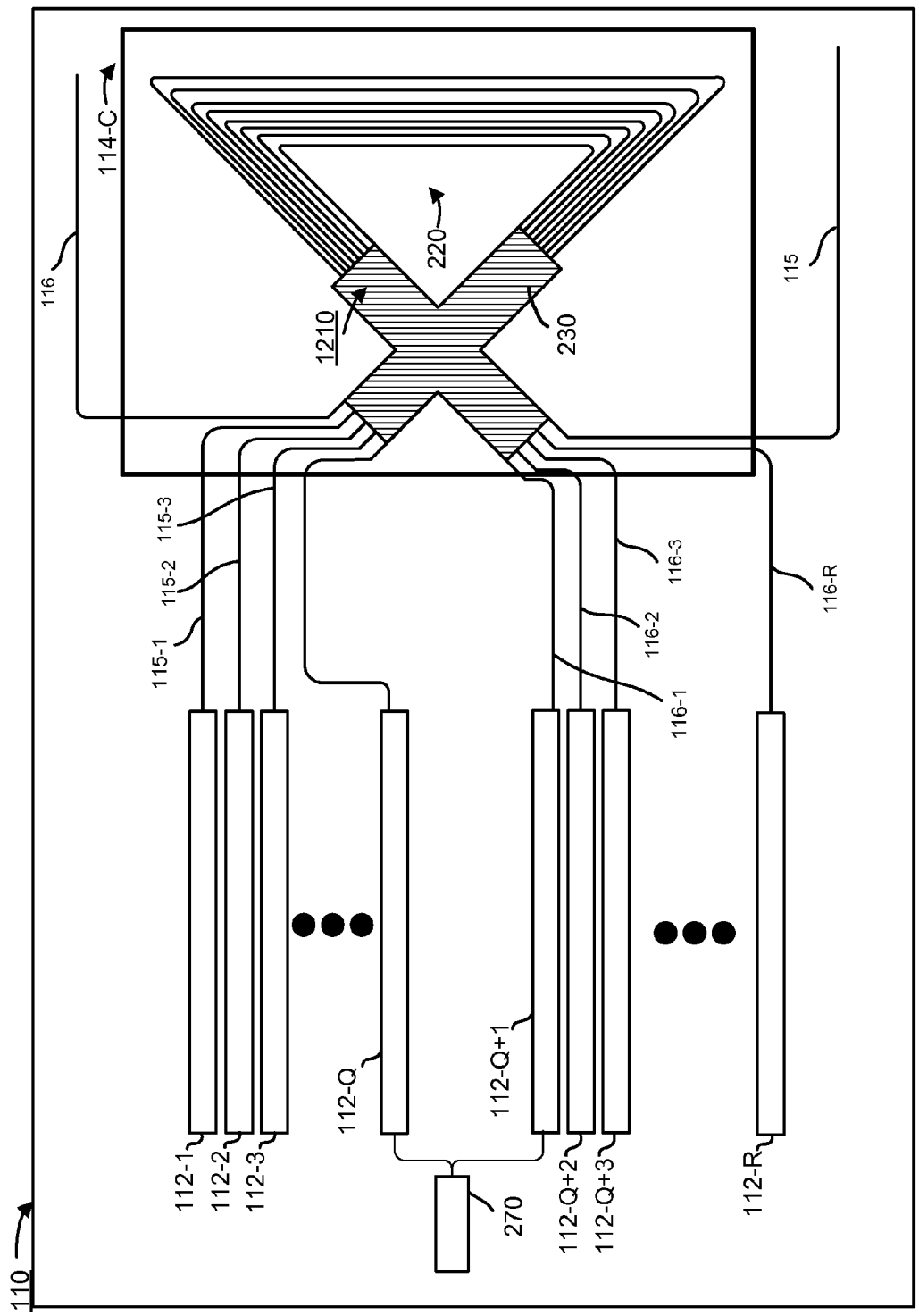
FIG. 16A is a diagram illustrating transmitter module according to an implementation described herein.

FIG. 16A is a diagram illustrating transmitter module 110 according to an implementation described herein. Transmitter module 110, as shown in FIG. 16A, may include similar elements as described above with respect to transmitter module 110 as shown in FIG. 12A. As shown in FIG. 16A, transmitter module 110 may include optical multiplexer 114-C which may have similar elements as described above with respect to optical multiplexer 114-B. Additionally, optical multiplexer 114-C may include material 230 and/or material 810 formed on slab 1210 (e.g., to form a TE polarizer or TM polarizer on slab 1210). For example, optical multiplexer 114-C may include material 230 and/or material 810 formed on slab 1210 in a similar manner as described above with respect to FIG. 4 and FIG. 8.

Figure 16B:
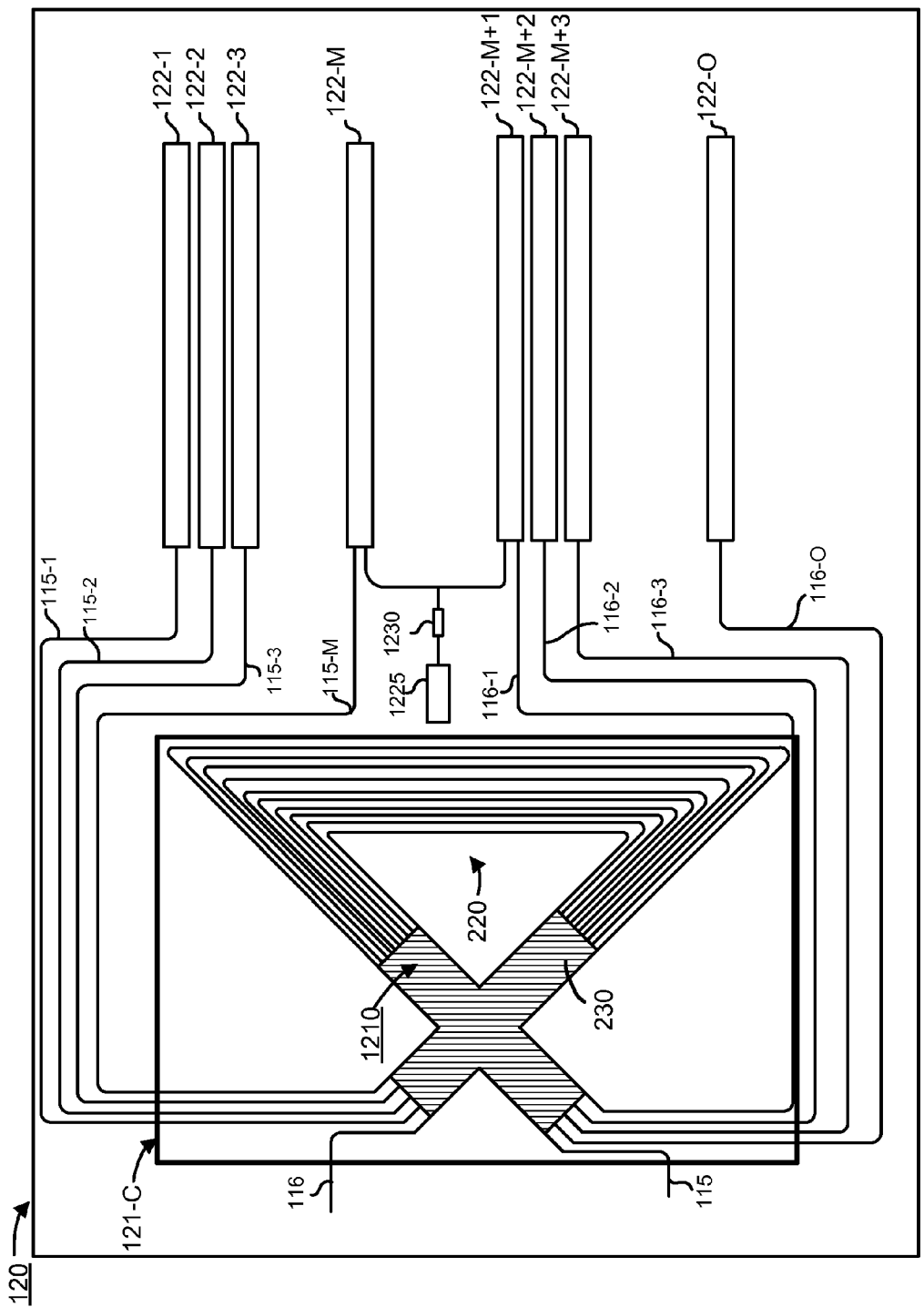
FIG. 16B is a diagram illustrating receiver module according to an implementation described herein.

FIG. 16B is a diagram illustrating receiver module 120 according to an implementation described herein. Receiver module 120, as shown in FIG. 16B, may include similar elements as described above with respect to receiver module 120 as shown in FIG. 12B. As shown in FIG. 16B, receiver module 120 may include optical demultiplexer 121-C which may have similar elements as described above with respect to optical demultiplexer 121-B. Additionally, optical demultiplexer 121-C may include material 230 and/or material 810 formed on slab 1210 (e.g., to form a TE polarizer or TM polarizer on slab 1210). For example, optical demultiplexer 121-C may include material 230 and/or material 810 formed on slab 1210 in a similar manner as described above with respect to FIG. 4 and FIG. 8.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system comprising:
    an optical demultiplexer circuit comprising:
        a slab comprising a propagation region,
            the propagation region comprising a first propagation section and a second propagation section,
            a portion of the first propagation section and a portion of the second propagation section overlapping each other to form a shared propagation section, the shared propagation section including both the portion of the first propagation section and the portion of the second propagation section,
            the first propagation section having a first end and a second end,
            the second propagation section having a first end and a second end;
        a plurality of waveguides, each of the plurality of waveguides having a respective first end and a respective second end,
            the first ends of the plurality of waveguides being directly connected to the second end of the first propagation section, and
            the second ends of the plurality of waveguides being directly connected to the second end of the second propagation section;
        a first plurality of photodiodes optically coupled to the first end of the first propagation section; and
        a second plurality of photodiodes optically coupled to the first end of the second propagation section,
    where:
    the first end of the first propagation section is configured to receive at least one first input,
    the first end of the first propagation section is configured to provide a plurality of first outputs,
    the first end of the second propagation section is configured to receive at least one second input,
    the first end of the second propagation section is configured to provide a plurality of second outputs,
    the first ends of the plurality of waveguides are configured to receive the at least one first input, and
    the second ends of the plurality of waveguides are configured to receive the at least one second input
    the optical system further comprising:
    a polarization beam splitter comprising:
        an input that receives an input optical signal; and
        first and second outputs,
            the first output providing a first polarization optical signal having a first polarization, and
            the second output providing a second polarization optical signal having a second polarization,
            where the at least one first input received by the first end of the first propagation section includes the first polarization optical signal or the at least one second input received by the first end of the second propagation section includes the second polarization optical signal.

2. The optical system in accordance with claim 1, where the at least one second input received by the first end of the second propagation section includes the second polarization optical signal provided by the polarization beam splitter,
    the optical system further comprising:
    a rotator comprising:
        an input that receives the first polarization optical signal,
            the rotator being configured to rotate the first polarization such that the first polarization optical signal has the second polarization, the rotator outputting the first polarization optical signal as a rotated first optical signal,
    where the at least one first input received by the first end of the first propagation section includes the rotated first optical signal provided by the rotator.

3. The optical system in accordance with claim 2, further including:
    a substrate, the optical demultiplexer circuit, the first plurality of photodiodes, the second plurality of photodiodes, the polarization beam splitter, and the rotator being provided on the substrate.

4. The optical system in accordance with claim 1, where a portion of the optical demultiplexer circuit defines an arrayed waveguide grating.

5. The optical system in accordance with claim 1, where the propagation region is substantially X-shaped.

6. The optical system in accordance with claim 1, where the propagation region is substantially V-shaped.

7. The optical system in accordance with claim 1, where the first propagation section is substantially perpendicular to the second propagation section.

8. An optical device, comprising:
a substrate;
a slab provided on the substrate;
a first waveguide provided on the substrate and extending from a first portion of the slab, the first waveguide supplying a first plurality of optical signals to the first portion of the slab;
a plurality of second waveguides, each having a first end and a second end, the first ends of the plurality of second waveguides being optically coupled to a second portion of the slab, and the second ends of the plurality of second waveguides being optically coupled to a third portion of the slab;
a plurality of third waveguides provided on the substrate and extending from a fourth portion of the slab, each of the plurality of third waveguides directing a corresponding one of the first plurality of optical signals away from the slab;
a fourth waveguide extending from the fourth portion of the slab, the fourth waveguide supplying a second plurality of optical signals to the fourth portion of the slab;
a plurality of fifth waveguides extending from the first portion of the slab, each of the plurality of fifth waveguides directing a corresponding one of the second plurality of optical signals away from the slab; and
a rotator that is optically coupled to the first portion of the slab, the first plurality of optical signals being input to the rotator with a first polarization, the rotator outputting each of the first plurality of optical signals with a second polarization, different than the first polarization, to the first portion of the slab.

9. The optical device in accordance with claim 8, where each of the first plurality of optical signals has a corresponding one of a plurality of wavelengths, and each of the second plurality of optical signals has a corresponding one of the plurality of wavelengths.

10. The optical device in accordance with claim 8, further including:
a first plurality of photodiodes, each of the first plurality of photodiodes receiving at least a portion of a corresponding one of the first plurality of optical signals; and
a second plurality of photodiodes, each of the second plurality of photodiodes receiving at least a portion of a corresponding one of the second plurality of optical signals.

11. The optical device in accordance with claim 10, where the first plurality of photodiodes and the second plurality of photodiodes are provided on the substrate.

12. The optical device in accordance with claim 8, where the rotator is provided on the substrate.

13. The optical device in accordance with claim 8, wherein the first polarization is a transverse electric (TE) polarization and the second polarization is a transverse magnetic (TM) polarization.

14. The optical device in accordance with claim 8, wherein the first polarization is a transverse magnetic (TM) polarization and the second polarization is a transverse electric (TE) polarization.

15. The optical device in accordance with claim 8, further comprising a material provided on the slab so that the slab constitutes a polarizer.

16. The optical device in accordance with claim 1, further comprising a material provided on the slab so that the slab constitutes a polarizer.

17. The optical device in accordance with claim 1, wherein the first polarization is a transverse magnetic (TM) polarization and the second polarization is a transverse electric (TE) polarization.

18. The optical device in accordance with claim 1, wherein the first polarization is a transverse electric (TE) polarization and the second polarization is a transverse magnetic (TM) polarization.

19. The optical device in accordance with claim 10, further including a local oscillator laser that supplies light to at least one of the first plurality of photodiodes.

20. The optical device in accordance with claim 1, further including a local oscillator laser that supplies light to at least one of the first plurality of photodiodes.

* * * * *